(12) United States Patent
Ellis

(10) Patent No.: US 8,336,573 B2
(45) Date of Patent: Dec. 25, 2012

(54) MODULAR MANIFOLD WITH QUICK DISCONNECT VALVE FITTINGS

(75) Inventor: Michael Robert Ellis, Yorba Linda, CA (US)

(73) Assignee: Coast Pneumatics, Inc., Anaheim, CA (US)

( * ) Notice: Subject to any disclaimer, the term of this patent is extended or adjusted under 35 U.S.C. 154(b) by 329 days.

(21) Appl. No.: 12/721,506

(22) Filed: Mar. 10, 2010

(65) Prior Publication Data

US 2011/0220224 A1 Sep. 15, 2011

(51) Int. Cl.
*F15B 13/00* (2006.01)

(52) U.S. Cl. .................. 137/271; 137/561 A; 285/124.4

(58) Field of Classification Search ............... 137/269, 137/271, 561 A, 884; 285/124.4, 124.5
See application file for complete search history.

(56) References Cited

U.S. PATENT DOCUMENTS

| | | | |
|---|---|---|---|
| 2,834,368 A | 5/1958 | Gray | |
| 3,341,168 A | 9/1967 | Toeppen | |
| 3,513,876 A | 5/1970 | Tarbox | |
| 3,560,027 A * | 2/1971 | Graham | 285/130.1 |
| 4,011,893 A | 3/1977 | Bentley | |
| 4,082,324 A | 4/1978 | Obrecht | |
| 4,171,559 A | 10/1979 | Vyse et al. | |
| 4,363,337 A * | 12/1982 | Pease | 137/343 |
| 4,544,130 A | 10/1985 | Stoll et al. | |
| 4,921,072 A | 5/1990 | Divisi | |
| 4,946,134 A | 8/1990 | Orlandi | |
| 4,947,891 A | 8/1990 | Genbauffe | |
| 5,437,301 A | 8/1995 | Ramsey | |
| 5,927,337 A | 7/1999 | LaMantia | |
| 5,988,203 A | 11/1999 | Hutton | |
| 6,039,360 A * | 3/2000 | Ohmi et al. | 285/61 |
| 6,068,016 A | 5/2000 | Manofsky, Jr. et al. | |
| 6,328,070 B2 | 12/2001 | Clayton et al. | |
| 6,374,859 B1 | 4/2002 | Vu et al. | |
| 6,715,510 B2 * | 4/2004 | Herbert | 137/884 |
| 6,807,981 B2 | 10/2004 | Miyazoe et al. | |
| 6,832,788 B2 | 12/2004 | Fukano et al. | |
| 6,929,032 B2 | 8/2005 | Rehder et al. | |
| 7,073,825 B2 * | 7/2006 | Takada et al. | 285/124.1 |
| 7,117,892 B2 | 10/2006 | Krywitsky | |

(Continued)

FOREIGN PATENT DOCUMENTS

WO WO 2004/021412 3/2004

OTHER PUBLICATIONS

International Search Report and Written Opinion dated Oct. 11, 2011, PCT Application No. US2011/027407.

*Primary Examiner* — Eric Keasel
*Assistant Examiner* — R. K. Arundale
(74) *Attorney, Agent, or Firm* — Knobbe, Martens, Olson & Bear, LLP

(57) ABSTRACT

A manifold for accommodating at least one fluid is constructed of a plurality of modules that can be interconnected and configured to create a customized manifold. Couplers interconnecting a flow cavity of each module can be selected to determine fluid flow characteristics between module flow cavities. Each module has one or more valve ports. Valves or other flow accommodating apparatus are attached to the manifold via adapters. A first end of each adapter is sized and configured to engage a valve port, and a second end engages the attached apparatus.

13 Claims, 27 Drawing Sheets

U.S. PATENT DOCUMENTS

| | | |
|---|---|---|
| 7,150,475 B2 | 12/2006 | Eriksson et al. |
| 7,600,825 B2 | 10/2009 | Ziegler |
| 7,677,265 B2 * | 3/2010 | Shikata et al. ............... 137/341 |
| 7,780,200 B2 * | 8/2010 | Mitsui et al. ............... 285/124.1 |
| 8,087,701 B2 * | 1/2012 | Sonerud .................... 285/124.5 |
| 2001/0003289 A1 | 6/2001 | Mead et al. |
| 2002/0000257 A1 | 1/2002 | Mead et al. |
| 2004/0194834 A1 | 10/2004 | Rehder et al. |
| 2006/0070663 A1 | 4/2006 | Schmitt |
| 2006/0157130 A1 | 7/2006 | Eidsmore et al. |
| 2006/0283514 A1 | 12/2006 | Rehder et al. |
| 2007/0204909 A1 | 9/2007 | Van Camp et al. |
| 2008/0023089 A1 | 1/2008 | Bennett |
| 2008/0066818 A1 | 3/2008 | Nicolini |
| 2008/0271800 A1 | 11/2008 | Curran et al. |
| 2009/0090415 A1 | 4/2009 | Harris et al. |
| 2009/0255596 A1 | 10/2009 | Leys |
| 2011/0220219 A1 | 9/2011 | Ellis |
| 2011/0220220 A1 | 9/2011 | Ellis |

* cited by examiner

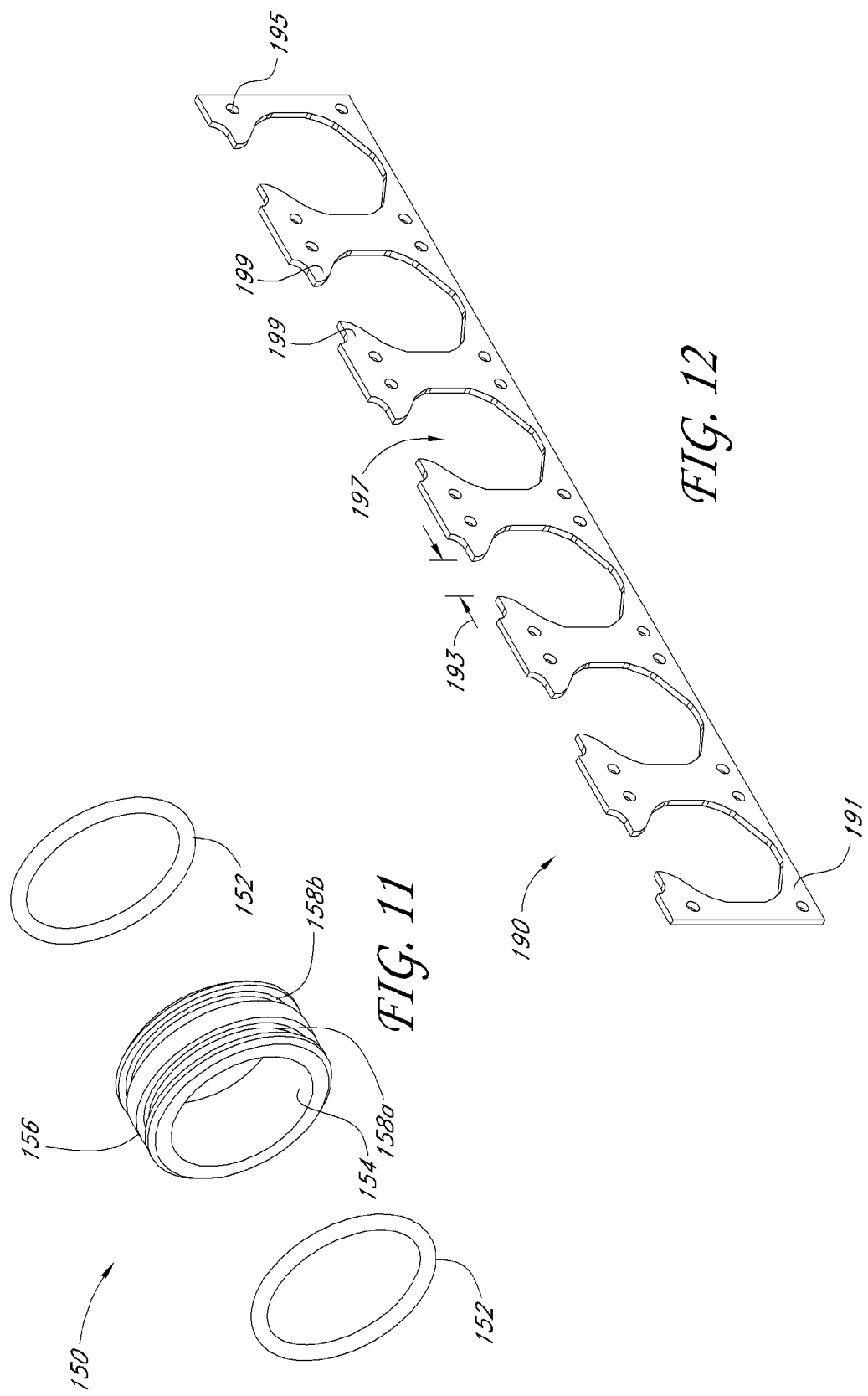

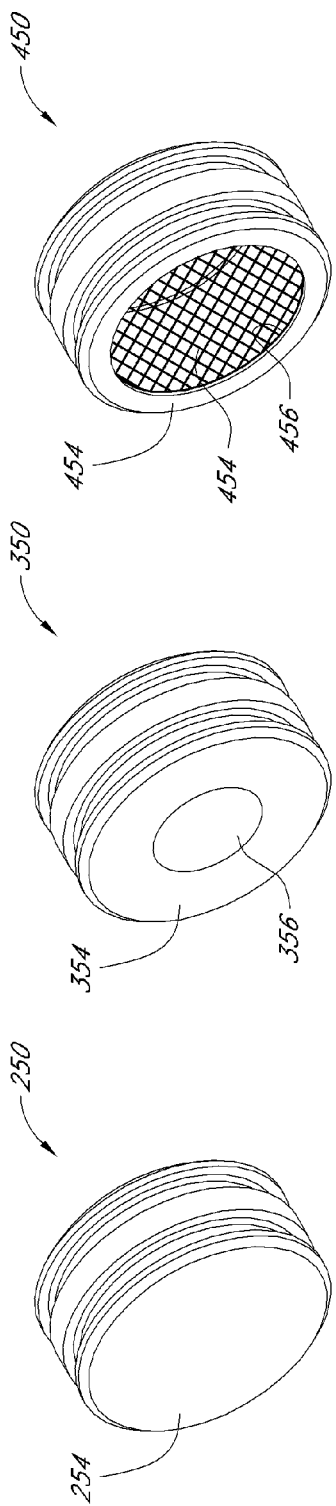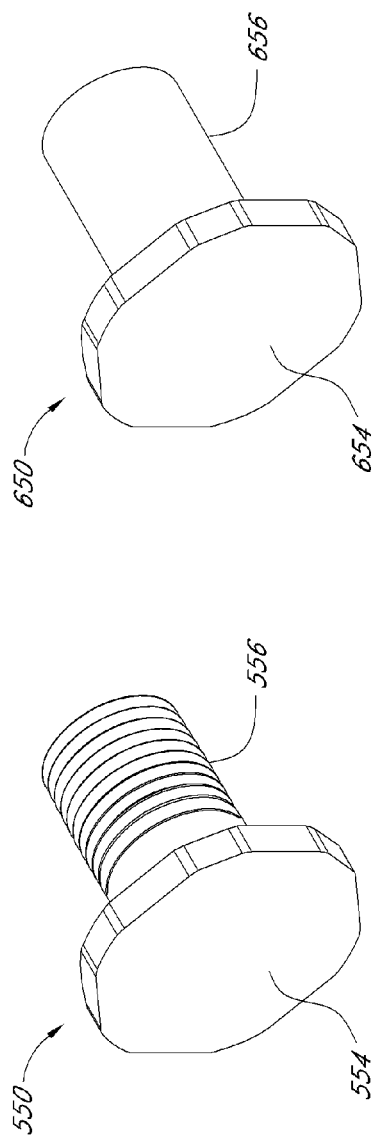

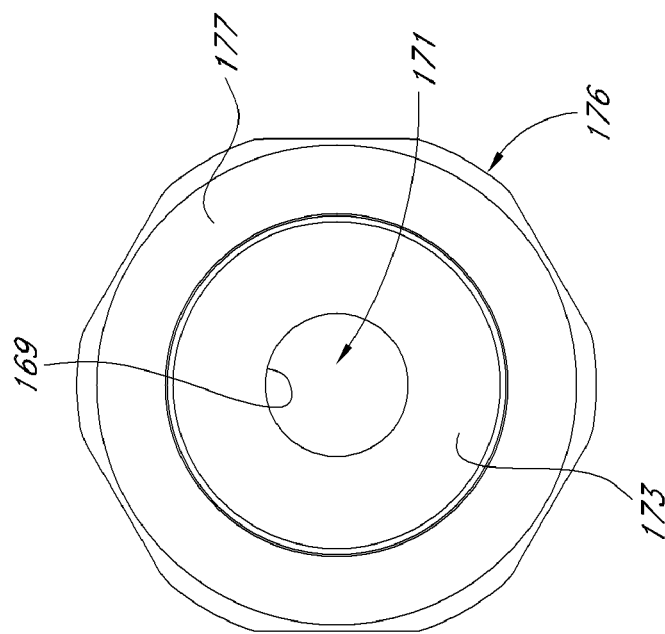
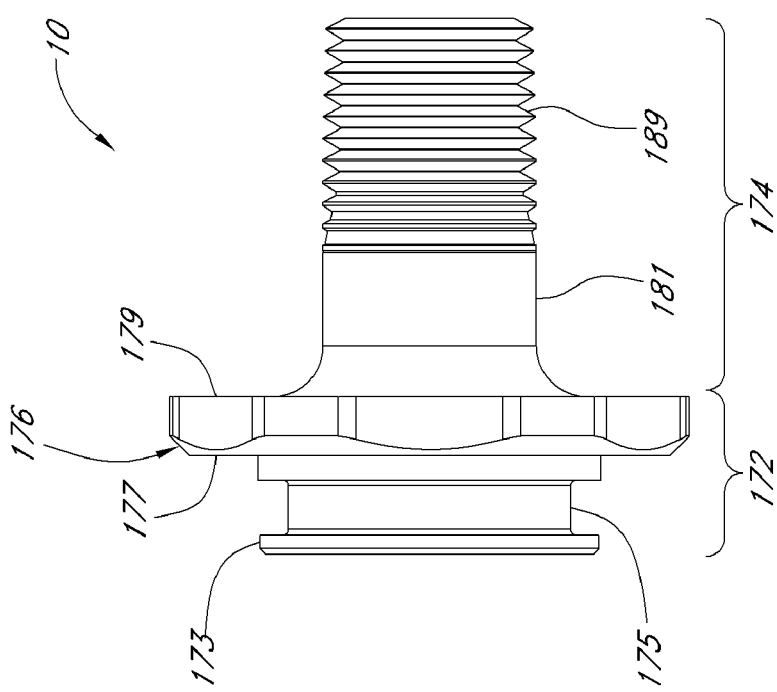

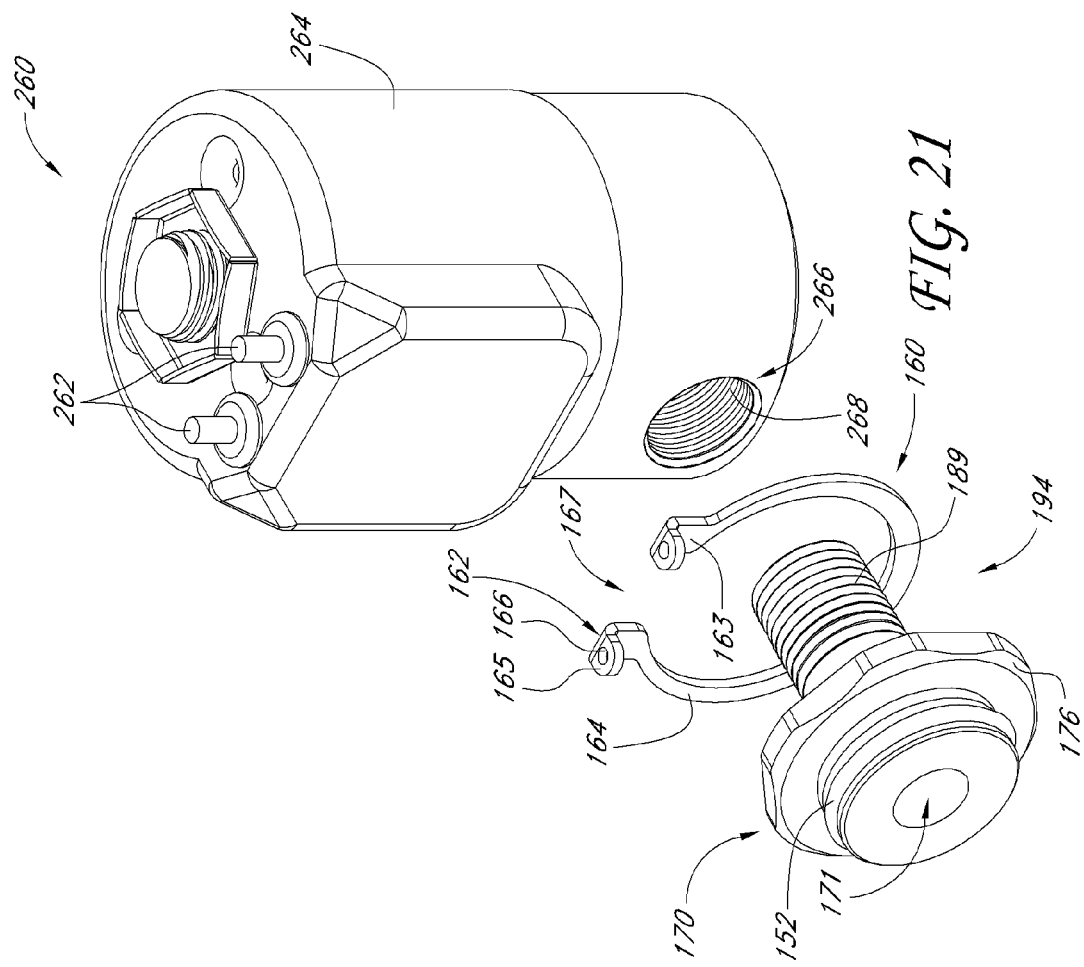
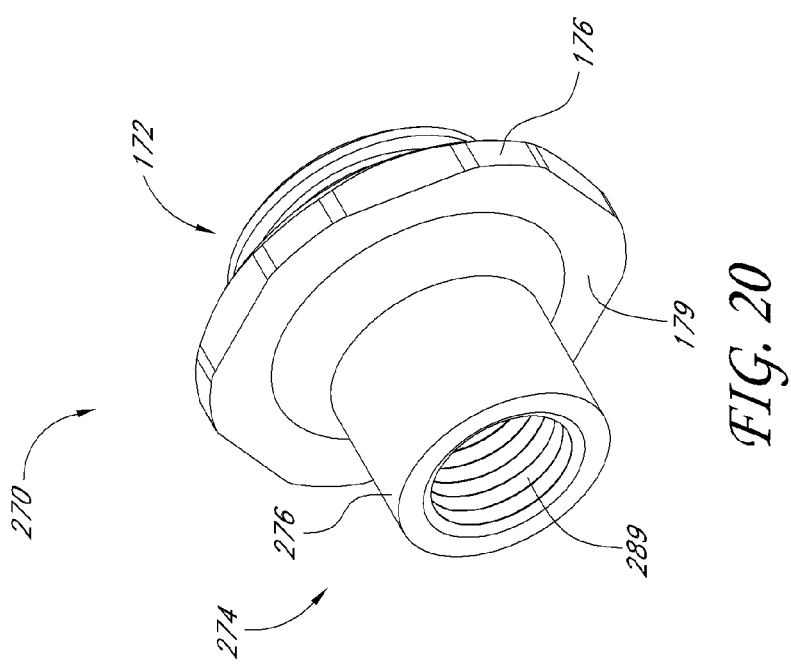

MODULAR MANIFOLD WITH QUICK DISCONNECT VALVE FITTINGS

BACKGROUND

1. Field of the Invention

This invention relates to fluid control devices and in particular this invention relates to a modular manifold and valve assembly.

2. Description of the Related Art

Manifolds are often used to direct fluid from a supply source to several outlets. Each installation may include a variety of valve inlets and outlets customized for the specific application. Customization of manifold and valve systems can be costly and require extensive time and specialized equipment specific to the valve system. Additionally, modifying an existing system such as to increase or decrease valve capacity and/or to change fluid flow paths may require acquiring an entirely new manifold or performing extensive modifications that are impractical in the field of service.

Additionally, valves generally are screwed directly on to the manifold, thus requiring the manifold to be large enough to accommodate the rotation of the valve body. In applications where space is limited, the manifold may not be able to accommodate the rotation of the valve body. In such circumstances, it can be very difficult and cumbersome to repair or replace valves, and in some instances the entire or most of the manifold will need to be disassembled in order to replace a single valve.

SUMMARY

Accordingly there is a need in the art for a manifold that can accommodate multiple valves spaced closely together, can be modified in the field to change capacity and/or flow paths, allows repair or removal of a single valve from the manifold without removal of other valves, and/or can accommodate valves of different sizes, shapes and configurations without requiring permanent physical changes to the manifold.

In accordance with one embodiment, the present invention provides a manifold, comprising a manifold body comprising first and second modules. Each module comprises opposing top and bottom faces, a side face, and at least one end face, and defines a module chamber therewithin. The first and second modules are joined end to end and cooperate to form a first manifold body side face that extends the length of the adjoined modules and to define a manifold chamber. A plurality of ports are formed through the manifold body side face and communicate with the manifold chamber A plurality of adapters are provided, each adapter having a manifold engagement portion and an attachment engagement portion. The manifold engagement portion is configured to sealingly and releasably engage one of the ports. A first elongate cladding is releasably attached to the first manifold body side face. The cladding spans at least one port of each of the adjoined first and second modules. The cladding also has an aperture positioned to correspond with a respective one of the ports and sized to accommodate the manifold engagement portion of an adapter extending therethrough.

In some embodiments, the first elongate cladding spans the entire length of the first module side face and at least one port of the adjoined second module. One such embodiment additionally comprises a second elongate cladding attached to the second module side face and generally abutting the first elongate cladding. In another such embodiment the first elongate cladding spans the entire length of the manifold body side face.

Additional embodiments comprise a releasable locking mechanism configured to prevent the adapter from disengaging from the associated port. The locking mechanism is associated with only a single port and is configured so that operation of the locking mechanism does not affect engagement of an adapter in any other port or interconnection of the adjoined modules.

In another embodiment the manifold body and attached cladding cooperate to define a pocket therebetween at or adjacent each port. Each adapter has a lock surface and each adapter is sized so that there is a space between the lock surface and the cladding when the adapter is engaged in the port. A locking member is releasably disposed in the pocket so as to be interposed between the cladding and the lock surface.

In some such embodiments a plurality of pockets are defined by the cooperating manifold body and cladding at or adjacent each port, and the locking member is simultaneously releasably disposed in a plurality of the pockets. In other such embodiments the cladding is attached to the first manifold body side at a plurality of locations about the circumference of each port. In further embodiments the locking member is deformable to fit through the cladding aperture, but expands upon release to a diameter or length greater than a diameter of the cladding aperture.

In yet another such embodiment, the locking member and pocket are configured so that the locking member does not cross a top or a bottom surface of the manifold body when disposed in the pocket. In one such embodiment the locking member and pocket are configured so that the locking member can be installed into the pocket or removed from the pocket without crossing the top or bottom surfaces of the manifold body.

In further embodiments, the first and second modules cooperate to define a second manifold body side face that extends the length of the adjoined modules and is generally opposite the first manifold body side face. A second elongate cladding is releasably attached to the second manifold body side face.

In a yet further embodiment the cladding is formed of a material having a modulus of elasticity greater than a modulus of elasticity of the material used to form the manifold modules. In some such embodiments the material used to form the manifold modules comprises a polymer, and the material used to form the cladding comprises a metal.

In still another embodiment the first module has a first length and the second module has a second length, and the first length is different than the second length.

In a still further embodiment the first module has a first number of ports and the second module has a second number of ports, and the first number is different than the second number.

In a yet further embodiment the first module has a plurality of first module ports formed through its side face, and an intra-module centerline distance is defined between adjacent first module ports, and the second module has a second module port adjacent the end face, wherein an inter-module centerline distance is defined between one of the first module ports and an adjacent second module port when the modules are joined end to end, and the intra-module centerline distance is substantially the same as the inter-module centerline distance.

In accordance with another embodiment, the present invention provides a kit for constructing a manifold. The kit comprises a first and a second elongate manifold module, each module comprising a side face and at least one end face and defining a chamber therewithin. Each of the first and second modules comprises a side port formed through the side face and an end port formed through the end face. The side and end ports communicate with the associated chamber. The first and second modules are configured to be releasably joined end to end at their end faces. The first and second modules are configured so that their side faces generally align to define a manifold body side face when the modules are joined end to end. A coupler is configured to be interposed between the adjoined first and second module end faces, the coupler configured to simultaneously sealingly engage both end ports. A plurality of adapters are provided. Each adapter has a manifold engagement portion and an attachment engagement portion. The manifold engagement portion of each adapter is configured to sealingly and releasably engage the side ports of the first and second modules. An elongate cladding is configured to engage the manifold body side face and has apertures corresponding to the ports. The apertures are sized and configured to accommodate the manifold engagement portion of an adapter extending therethrough. The elongate cladding has a length sufficient to span at least one port of the first module and at least one port of the second module.

In one kit embodiment each of the side ports is configured to mate with each adapter's manifold engagement portion. In one such embodiment each of the adapters have a substantially similar engagement portion, and at least two of the adapters have differently-configured attachment engagement portions.

Another kit embodiment comprises a plurality of couplers. A first one of the couplers is configured to enable fluid flow therethrough so as to combine adjacent module chambers into a common fluid chamber, and a second one of the couplers is configured to prevent fluid flow therethrough so that adjacent module chambers do not fluidly communicate.

Yet another kit embodiment additionally comprises a third elongate module comprising a side face, an end face, a chamber defined therewithin, a side port formed through the side face, and an end port formed through the end face. The third module is configured to be joined end-to-end with the second module so that the first, second and third module side faces generally align. The elongate cladding has a length sufficient to span at least one side port of the first module, the entire length of the second module, and at least one side port of the third module.

In accordance with yet another embodiment, the present invention provides a fluid flow system, comprising a manifold, a plurality of adapters and a locking system. The manifold defines a chamber therewithin. First and second ports are formed through a side of the manifold and are positioned generally adjacent one another. The ports each have an engagement surface comprising a wall having a non-circular port geometric shape as viewed along an axis of the port. Each adapter has a port engagement region, an attachment engagement region, and an elongate passage extending from the port engagement region to the attachment engagement region. Each port engagement region has a non-circular adapter geometric shape as viewed along an axis of the adapter. The adapter geometric shape is sized generally complementary to the port engagement shape so that the adapter engagement region can be advanced over the adapter axis into the port engagement surface when the port and adapter geometric shapes are aligned. When the adapter engagement region is engaged with the port engagement surface, the port and adapter geometric shapes are engaged so as to prevent significant rotation relative to one another. The locking system is configured to releasably lock the adapter port engagement region in engagement with the port.

In some flow system embodiments the port geometric shape is generally symmetrical about a plane through the port axis. In further embodiments the port and adapter geometric shapes are configured so that when the adapter axis is generally aligned with the port axis the port and adapter geometric shapes can be perfectly aligned by rotating the adapter no more than 90° in any rotational direction about the aligned axes.

In additional embodiments the port and adapter geometric shapes are configured so that when the adapter axis is generally aligned with the port axis the port and adapter geometric shapes can be perfectly aligned by rotating the adapter no more than 75° in any rotational direction about the aligned axes.

In yet further embodiments the port and adapter geometric shapes are configured so that when the adapter axis is generally aligned with the port axis the port and adapter geometric shapes can be perfectly aligned by rotating the adapter no more than 60° in any rotational direction about the aligned axes. In some such embodiments the port geometric shape is generally hexagonal.

In another embodiment the locking system is configured so that the adapter can be releasably locked into and unlocked from the port independently of another adapter in an adjacent port.

In yet another embodiment the port engagement regions of each of the plurality of adapters is substantially the same so that each of the plurality of adapters fits into each of the ports, and wherein at least one of the adapters has an attachment engagement region that is configured differently than the attachment engagement regions of others of the adapters.

In accordance with still another embodiment, the present invention provides a method of attaching a fluid management device to a manifold. In the method, a manifold is provided having a port with an engagement surface comprising a non-circular port geometric shape as viewed along an axis of the port. An adapter is provided having a port engagement region, an attachment engagement region and an elongate passage from the port engagement region to the attachment engagement region. The adapter port engagement region has a non-circular adapter geometric shape as viewed along an axis of the adapter. The port geometric shape and adapter geometric shape are generally complementary to one another. The method includes threadingly attaching the attachment region of the adapter to a threaded connector of a fluid management device and rotating the adapter and apparatus relative one another until the adapter and device are sealingly attached, additionally rotating the fluid management device relative to the adapter in a tightening direction and rotating the adapter about its axis until the adapter geometric shape is aligned with the port geometric shape and the fluid management device is in a desired orientation relative to the manifold, and advancing the attached adapter and fluid management device over the port axis sufficient to engage the adapter port engagement region with the port so that the port engagement shape is engaged with the adapter engagement shape.

In some embodiments the step of additionally rotating the fluid management device relative the adapter in a tightening direction after the adapter and device are already sealingly attached comprises rotating no more than about 90° from any rotational position on the adapter attachment region.

In additional embodiments the fluid management device is a valve.

In other embodiments the step of additionally rotating the fluid management device relative the adapter in a tightening direction after the adapter and device are already sealingly attached comprises rotating no more than about 75° from any rotational position on the adapter attachment region.

In still other embodiments the step of additionally rotating the fluid management device relative the adapter in a tightening direction after the adapter and device are already sealingly attached comprises rotating no more than about 60° from any rotational position on the adapter attachment region. In some such embodiments the port engagement shape is generally hexagonal.

In accordance with a still further embodiment, the present invention provides a fluid flow system. The fluid flow system comprises at least one valve, at least one valve adapter, and at least one locking member. The valve adapter has a valve engagement region and a manifold engagement region. The valve engagement region is coupled to the valve. The system additionally comprises a manifold body comprising a cavity, at least one module comprising at least one port, and at least one pocket corresponding to the at least one port. The module port has a port wall configured to engage the manifold engagement region of the valve adapter. The port is configured to be in fluid communication with the cavity. When the valve adapter is releasably coupled to the manifold body the port wall engages the manifold engagement region such that the valve adapter is constrained from rotational movement. The at least one locking member engages the at least one pocket and spans across at least part of the valve adapter such that the valve adapter is restricted from being decoupled from the manifold body without first disengaging the locking member. The valve is in fluid communication with the cavity through the adapter.

Another embodiment further comprises at least one plate coupled to the manifold body, wherein the at least one pocket is defined between the plate and the manifold body.

In another embodiment one of the at least one ports is an inlet port configured to be in fluid communication with the cavity. Another embodiment further comprises a fluid source that is coupled to the inlet port and is in fluid communication with the cavity.

In yet another embodiment the manifold engagement region has a generally hexagonally shaped region. The port wall has a substantially hexagonally shaped region, and the respective hexagonally shaped regions register with one another when the valve adapter is releasably coupled to the manifold body.

Still another embodiment further comprises a control system configured to control the operation of the at least one valve.

In accordance with still another embodiment, the present invention provides a fluid management system. A manifold body of the system comprises a top surface, a bottom surface, and a side surface. The manifold body defines a chamber. A plurality of ports are formed through the side surface and communicating with the chamber. An adapter of the system has a manifold engagement region comprising a sealing portion configured to sealingly engage one of the ports of the manifold body. The adapter has an axis that is generally aligned with an axis of the port when the adapter is engaged with the port. The adapter has a lock surface disposed proximal of the sealing portion and facing generally proximally. Each port of the manifold body comprises an outer wall having an outer wall aperture, and the adapter and port are configured so that when the sealing portion sealingly engages a port, the adapter lock surface is disposed distal of the port outer wall. A pocket is defined on a side of the manifold body outer wall opposite the manifold body side face. A locking member is configured to removably fit into the pocket and to extend at least partially across the port so as to be interposed between the adapter lock surface and a plane of the manifold body outer wall. The locking member is compressible between a first configuration and a second configuration. When in the first configuration the locking member can be advanced through the outer wall aperture. When in the second configuration the locking member is at least partially relaxed and will not fit through the outer wall aperture.

In another embodiment, when fit into the pocket, the locking member is interposed between the adapter lock surface and the plane of the manifold body outer wall on opposing sides of the adapter axis.

In yet another embodiment the pocket is defined by an engagement aperture formed in the body adjacent the outer wall, and at least a portion of the engagement aperture has a diameter greater than a diameter of the outer wall aperture. In one such embodiment the engagement aperture has a generally circular circumference.

In a further embodiment the locking member has a generally incomplete ring-shape and comprises spaced apart tabs. A diameter of the locking member is reduced when the tabs are urged toward one another.

In a yet further embodiment the locking member has a generally incomplete ring-shape and comprises spaced apart tabs. A diameter of the locking member is reduced when the tabs are urged toward one another, and a distance between the tabs is greater when the locking member is in the second configuration that when the locking member is in the first configuration.

In still another embodiment, no part of the locking member extends past the manifold body top surface or bottom surface when fit into the pocket. In some such embodiments the manifold body and locking member are configured so that the locking member can be fit into and removed from the pocket without crossing the manifold body top surface or bottom surface. In other such embodiments the manifold body comprises a space configured to accept the locking member tabs therewithin.

In yet another embodiment the manifold body outer wall is detachably connected to the rest of the manifold body. In some such embodiments the outer wall comprises an elongate cladding. In other such embodiments the pocket is defined between the outer wall and the manifold body. In further such embodiments the manifold comprises a plurality of modules joined together, and the elongate cladding spans between and connects adjacent modules. The locking member interacts with only a single one of the ports.

In accordance with still another embodiment, a fluid management system is provided. A manifold body of the system comprises a top surface, a bottom surface, and a side surface. The manifold body defines a chamber, a plurality of ports formed through the side surface and communicating with the chamber. An adapter of the system has a manifold engagement region comprising a sealing portion configured to sealingly engage one of the ports of the manifold body. The adapter has an axis that is generally aligned with an axis of the port when the adapter is engaged with the port. The adapter has a lock surface disposed proximal of the sealing portion and facing generally proximally. A locking mechanism of the system can be selectively changed between a locked configuration and an unlocked configuration. The locking mechanism is configured to affect only a single corresponding one of the manifold body ports. When in the locked configuration the locking mechanism simultaneously engages the manifold body and the adapter lock surface so as to block the adapter from moving away from the manifold body. Further, when in the locked configuration the locking mechanism does not cross the top or bottom surfaces of the manifold body.

In yet another embodiment the locking mechanism is configured so as not to cross the top or bottom surfaces of the manifold body when moving between the unlocked configuration and locked configuration.

Still another embodiment additionally comprises an accessory device releasably mounted on the manifold body top surface.

In accordance with a yet further embodiment, a method of assembling a fluid management system is provided. The method includes joining a first manifold module to a second manifold module, and connecting an elongate cladding to the manifold side face. The first manifold module defines a first cavity and has a first port formed through a first side face and communicating with the first cavity. The second manifold module defines a second cavity and has a second port formed through a first side face and communicating with the second cavity module. Joining the first and second modules comprises aligning the first side faces to form a manifold body side face. The first and second ports are adjacent one another on the manifold body side face. Connecting the elongate cladding comprises connecting the cladding to the manifold side face so that the elongate cladding spans the first and second ports and so that first and second apertures formed through the cladding align with the first and second ports, respectively.

In still further embodiments, couplers may be installed between modules to sealingly interconnect adjacent module cavities. In some embodiments installing a coupler includes the step of selecting a coupler from a group of couplers having differing properties so as to effectively join cavity to cavity, sealingly block adjacent cavities, and/or treat or otherwise affect flow between adjacent module cavities depending on the structure of the coupler.

BRIEF DESCRIPTION OF THE DRAWINGS

FIG. 11 is a perspective view of one embodiment of a module coupler.
FIG. 12 is a perspective view of one embodiment of a manifold plate.
FIG. 15A is a perspective view of another embodiment of a module coupler.
FIG. 15B is yet another embodiment of a module coupler.
FIG. 15C is still another embodiment of a module coupler.
FIG. 16 is an embodiment of an end port flow blocker.
FIG. 17 is an embodiment of a valve port flow blocker.
FIG. 18 is a side view of an embodiment of a valve adapter.
FIG. 19 is an end view of the valve adapter of FIG. 18.
FIG. 20 is a perspective view of another embodiment of a valve adapter.
FIG. 21 is an exploded view of an embodiment of a valve adapter assembly employing the valve adapter of FIG. 18.

DETAILED DESCRIPTION OF PREFERRED EMBODIMENTS

Figure 1:
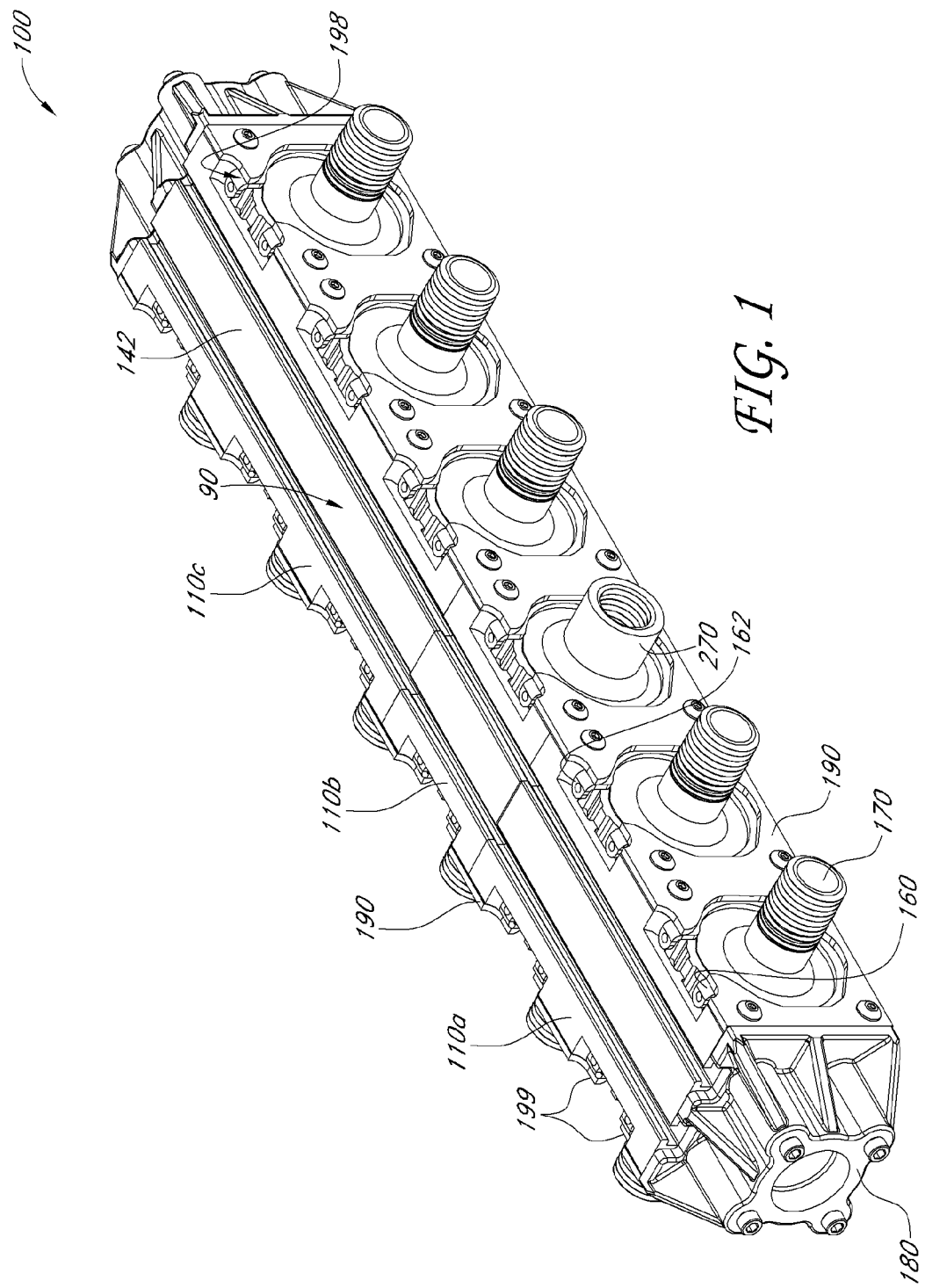
FIG. 1 is a perspective view of one embodiment of a manifold.
Figure 2:
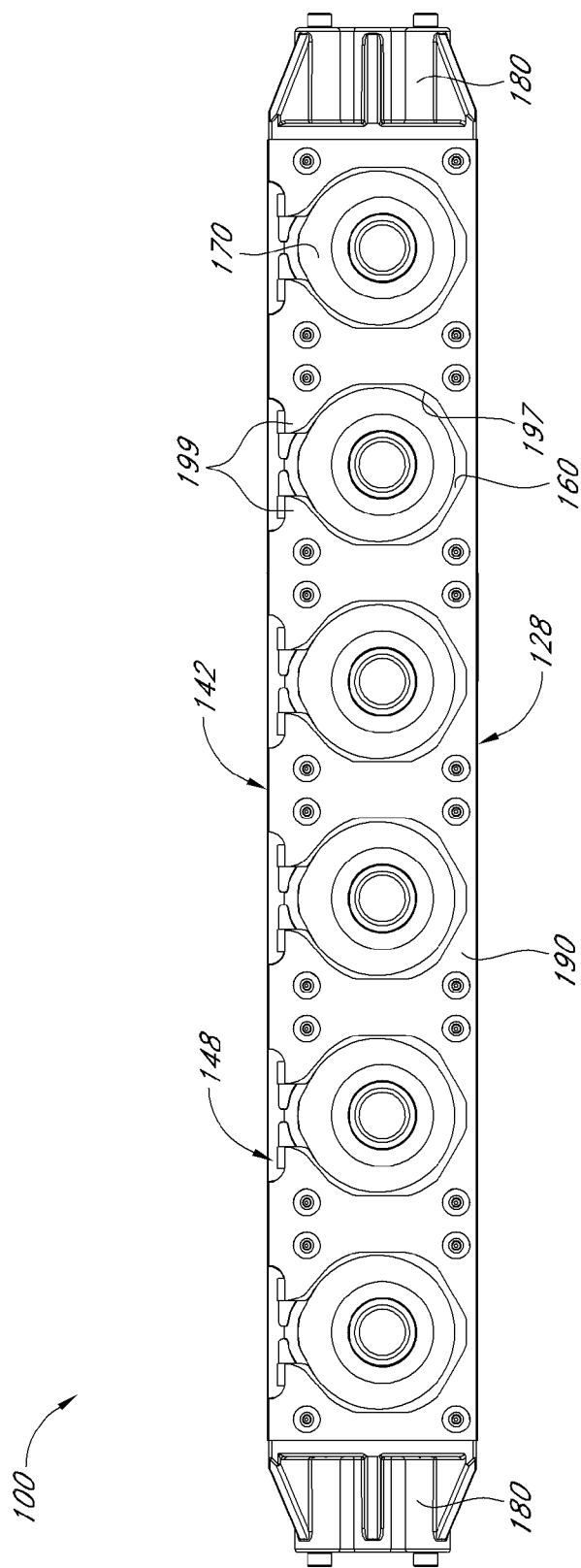
FIG. 2 is a side view of the manifold of FIG. 1.
Figure 3:
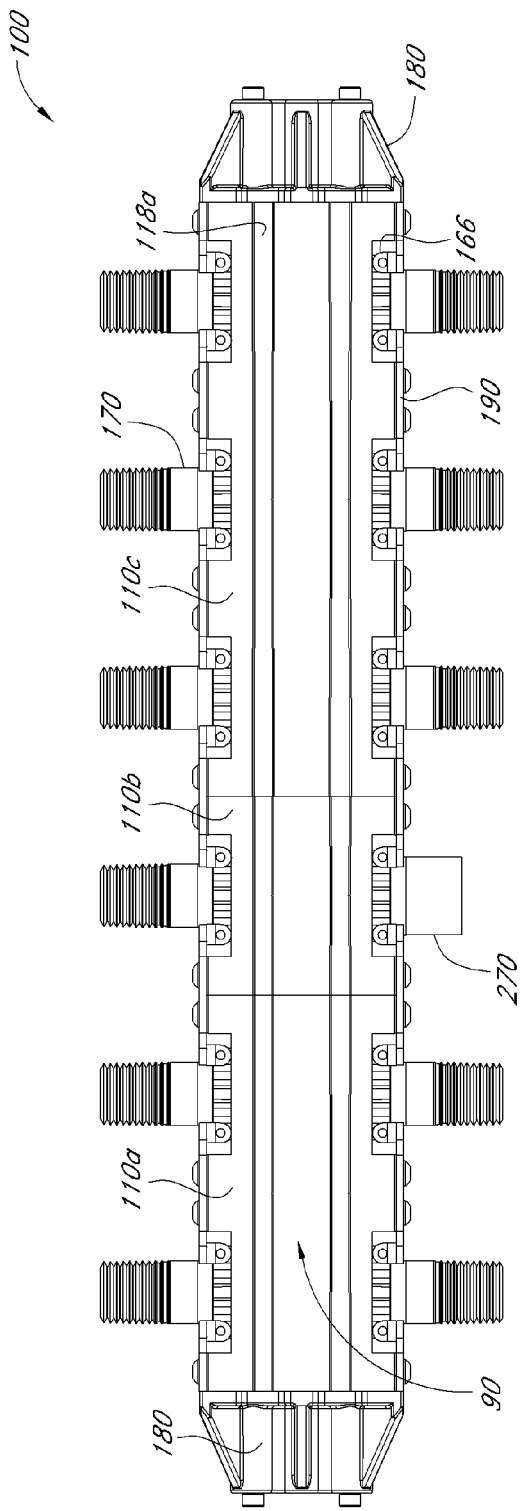
FIG. 3 is top view of the manifold of FIG. 1.

With initial reference to FIGS. 1-5, an embodiment of a manifold 100 is shown, which manifold 100 can be used in conjunction with valves and valve control systems for a fluid flow system. The illustrated manifold 100 is presented herein as an example to aid in describing principles and structure in accordance with several embodiments. It is understood that manifolds having a different appearance or differences in specific structure may still employ one or more of the principles discussed herein.

The illustrated manifold 100 comprises a modular manifold system that allows the size of the manifold 100 to be adjusted and configured to meet the needs of the particular application. In this embodiment the manifold 100 comprises a manifold body assembly 90 made up of three modules 110a-c. Preferably multiple modules 110 are connected end to end, and a cladding or plate 190 spans a length of the body 90 across the modules. A more detailed discussion of the modules is presented below.

The manifold 100 has a plurality of ports including end ports 120 and valve ports 130 that communicate with an interior cavity 196 that defines an interior chamber. The end ports 120 and valve ports 130 can function as fluid inlets and outlets. As will be discussed in more detail below, a single manifold may be configured to handle multiple fluids flowing through the plurality of inlets and outlets, and the manifold 100 may be configured to isolate or mix the multiple fluid flows as desired.

Each of the valve ports 130 is configured to couple with a valve adapter assembly 194, which preferably comprises a fitting or valve adapter 170, a sealing member 152 such as an elastomeric o-ring, and a locking member 160 such as a snap ring. The valve adapter assemblies 194 are configured to releasably couple with the manifold 100 at one end and a valve or other fluid flow device at the other end. The locking member 160 preferably fits between the valve adapter 170 and the plate 190, and secures the valve adapter 170 in the valve port 130. As will be discussed in embodiments described below, preferably, the valve adapter 170 is not free to rotate relative the manifold 100 when it is secured within the valve port 130.

Figure 6:
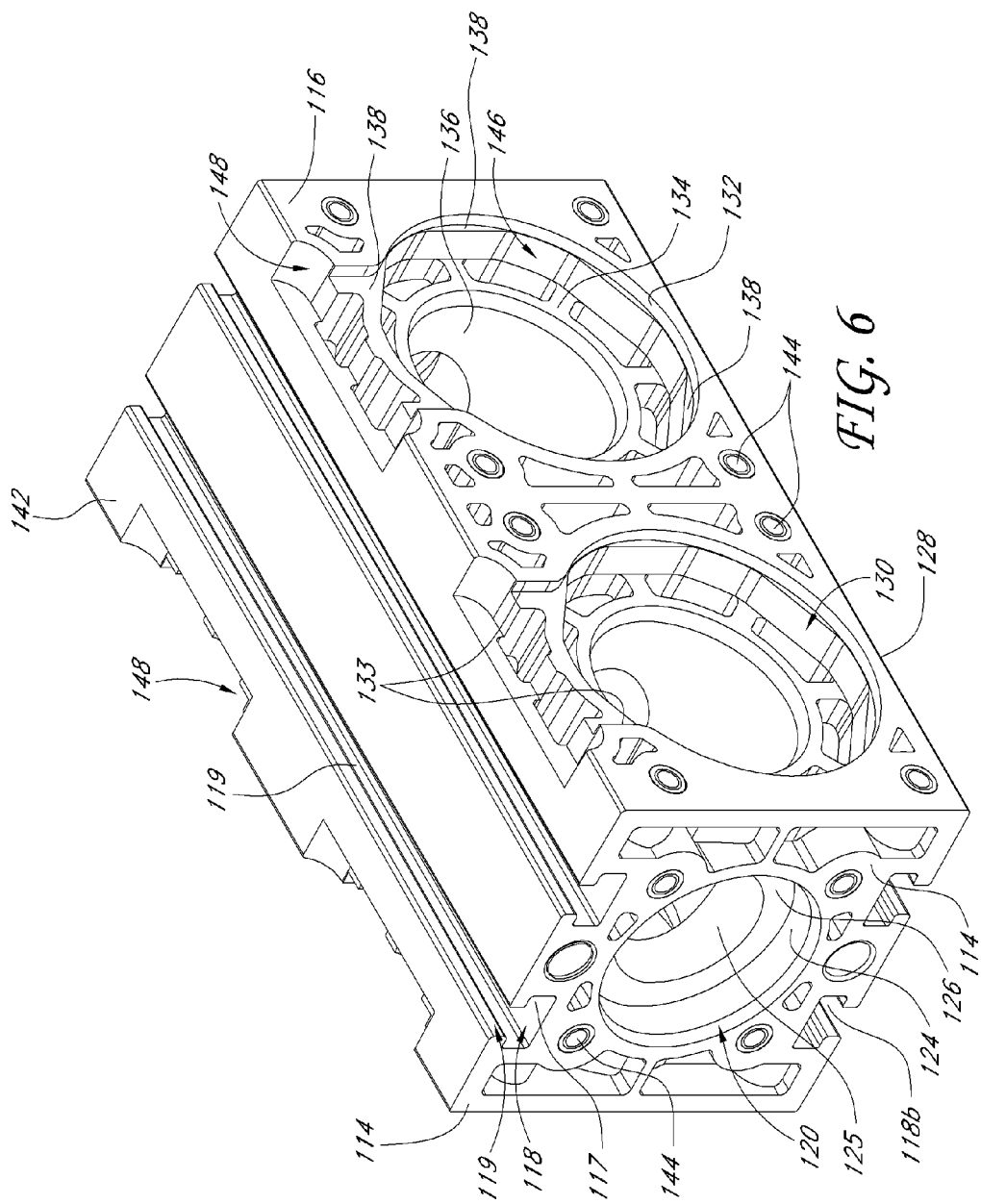
FIG. 6 is a perspective view of one embodiment of a manifold module.
Figure 7:
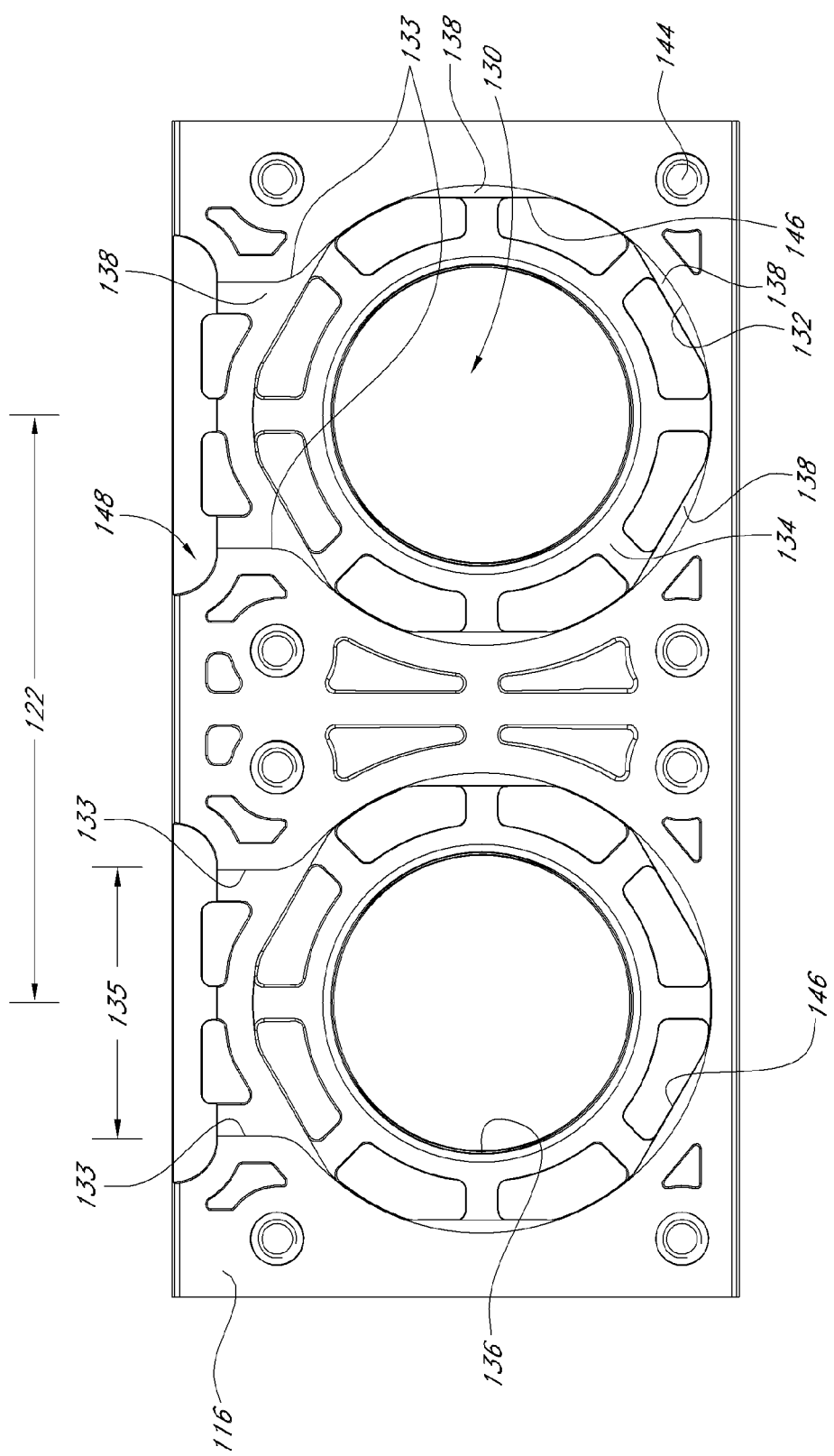
FIG. 7 is a side view of the module of FIG. 6.

With reference next to FIGS. 6 and 7, the illustrated module 110a has top and bottom faces 142, 128, opposing side faces 116 and opposing end faces 114. Four valve ports 130 and two end ports 120 are formed through the side and end faces 116, 114, respectively. Preferably the valve ports 130 are generally symmetrical about a center axis of the module body. In other embodiments, the spacing and/or number of ports may differ on opposing side faces or opposing end faces.

In the illustrated embodiment each valve port 130 is generally defined by a first outer wall 132, a valve adapter interface 146, a first recessed face 134, and a first interior wall 136. The first outer wall 132 extends inwardly from the face 116 and transitions to the valve adapter interface 146, which extends further inwardly to the first recessed face 134.

Preferably the valve adapter interface 146 extends circumferentially and defines a non-circular shape as viewed looking toward the face 116. In this embodiment the valve adapter interface 146 is generally hexagonal, and more particularly is a modified hexagonal shape having rounded corners. In some embodiments the valve adapter interface 146 may be another geometric shape, such as a square, octagon, ellipse, or another symmetrical or asymmetrical shape. The first interior wall 136 extends inwardly from the first recessed face 134, and preferably defines a smooth, circumferential wall.

With continued reference to FIGS. 6 and 7, the first outer wall 132 preferably has a generally circular shape as viewed looking toward the face 116 and has a diameter at least as great as the valve adapter interface 146. In the illustrated embodiment the first outer wall 132 deviates from its generally-circular shape, and upper portions 133 extend toward the top face 142 so that a space 135 is defined between the upper portions 133. A second recessed face 138 is located above the valve port 130 and in the space 135 between the upper portions 133. Preferably, the depth of the space 135 is the thickness of the first outer wall 132. The second recessed face 138 is at a transition between the first outer wall 132 and the adapter interface 146. Preferably additional portions of the second recessed face 138 are disposed about the circumference of the port 130. In the illustrated embodiment the portions of the second face 138 are discontiguous. In other embodiments, the second face 138 can extend generally contiguously about the circumference of the port.

A top recess 148 is formed through the top face 142 at each valve port 130 and is generally contiguous with the space 135. In the illustrated embodiment, the top recess 148 is also formed through the side face 116 adjacent each valve port 130.

In the illustrated embodiment, adjacent valve ports 130 have substantially identical structure. Of course, in other embodiments a manifold module 110 can be configured to have more than one size or configuration of valve ports 130. The distance between adjacent valve ports 130 is defined by a centerline distance 122 between the ports 130. Additionally, in the illustrated embodiment each valve face 116 includes a plurality of fastener engagement holes 144 spaced around each valve port 130.

With continued reference to FIGS. 6 and 7, the end port 120 is generally defined by an end face 114, a second outer wall 124, a third recessed face, or end port recessed face 126, and a second interior wall 125. The second outer wall, or end port outer wall 124, extends inwardly from the face 114 to the third recessed face 126 and preferably defines a smooth, circumferential surface. The second interior wall 125 extends inwardly from the third recessed face 126 and preferably helps define an interior cavity of the module. In this embodiment the end face 114 has four fastener engagement holes 144 spaced about the end port 120.

Figure 4:
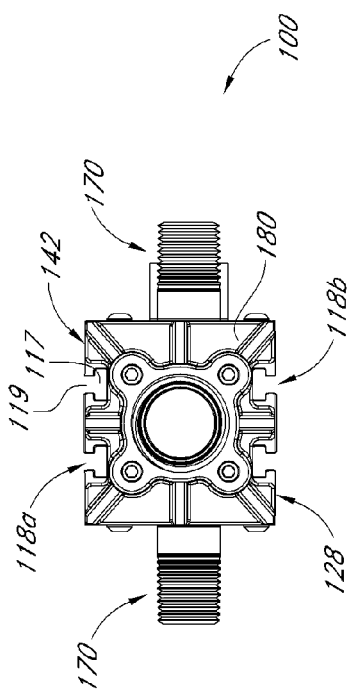
FIG. 4 is an end view of the manifold of FIG. 1.
Figure 5:
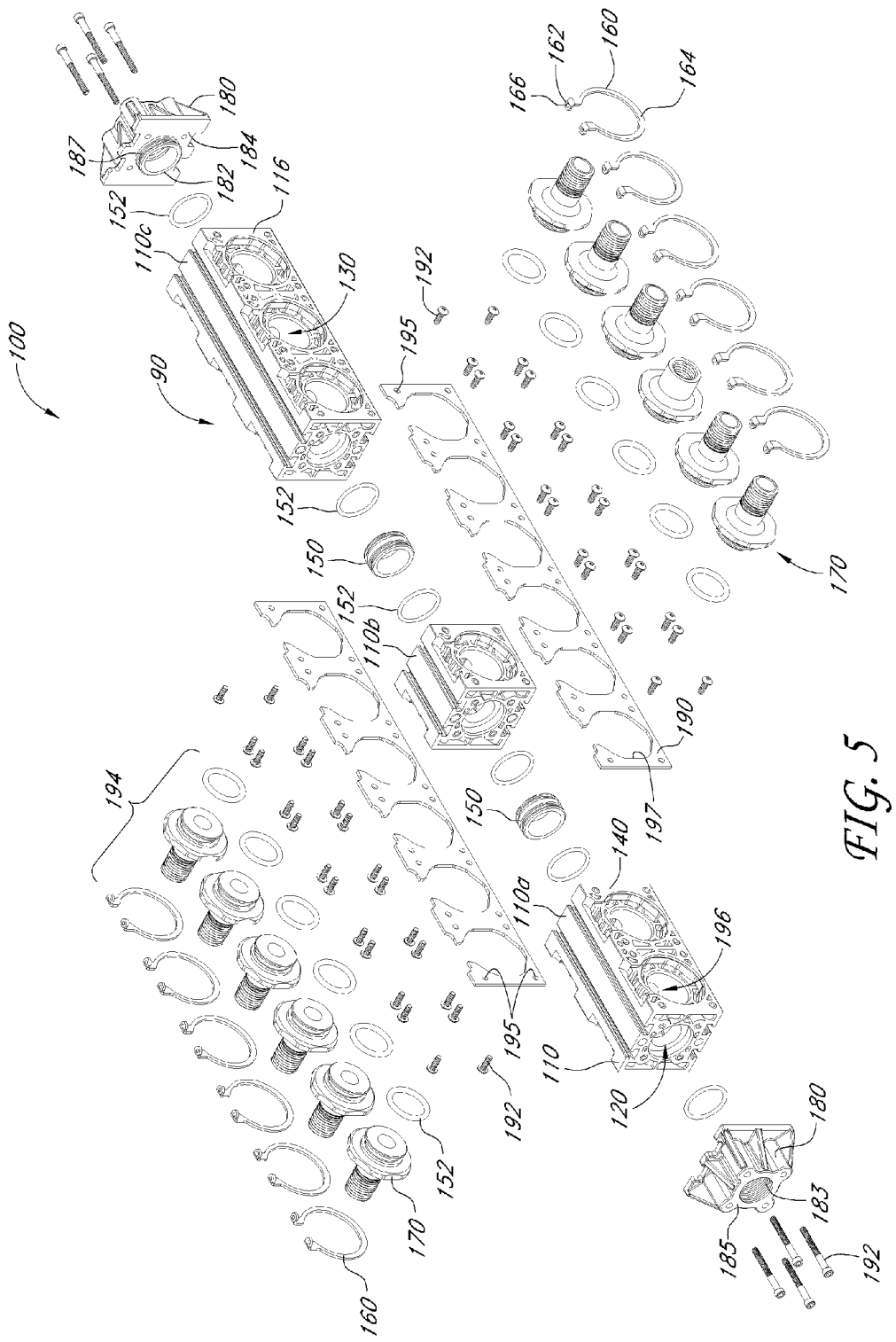
FIG. 5 is an exploded view of the manifold of FIG. 1.

With additional reference to FIGS. 4 and 5, the top face 142 of the module has a first plurality of elongate tracks 118a. The tracks 118a preferably are uniformly spaced on different ones of the modules so that they will be aligned when a plurality of modules 110 are coupled together end-to-end. The tracks 118 are configured to engage various accessories to the manifold 100. In the illustrated embodiment each track has a main cavity 117 and an opening 119, and a width of the main cavity 117 is greater than a width of the opening 119. A second plurality of tracks 118b that are substantially the same as and mirror the first plurality of tracks 118a preferably are formed through the bottom face 128 of the module. Of course, some embodiments may employ differently-configured tracks, and/or a different connector configuration, at the bottom than at the top.

Figure 8:
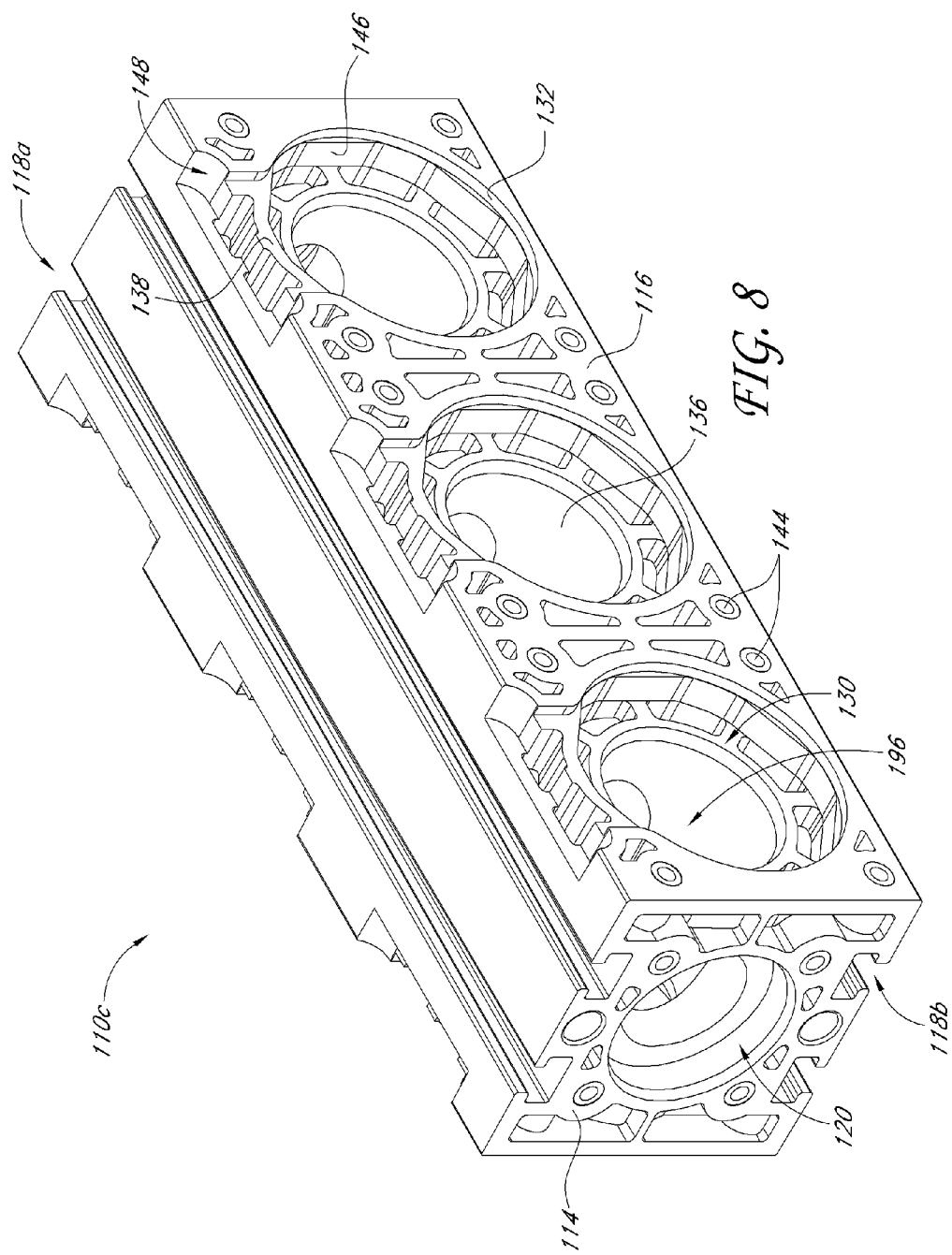
FIG. 8 is a perspective view another embodiment of a manifold module.
Figure 9:
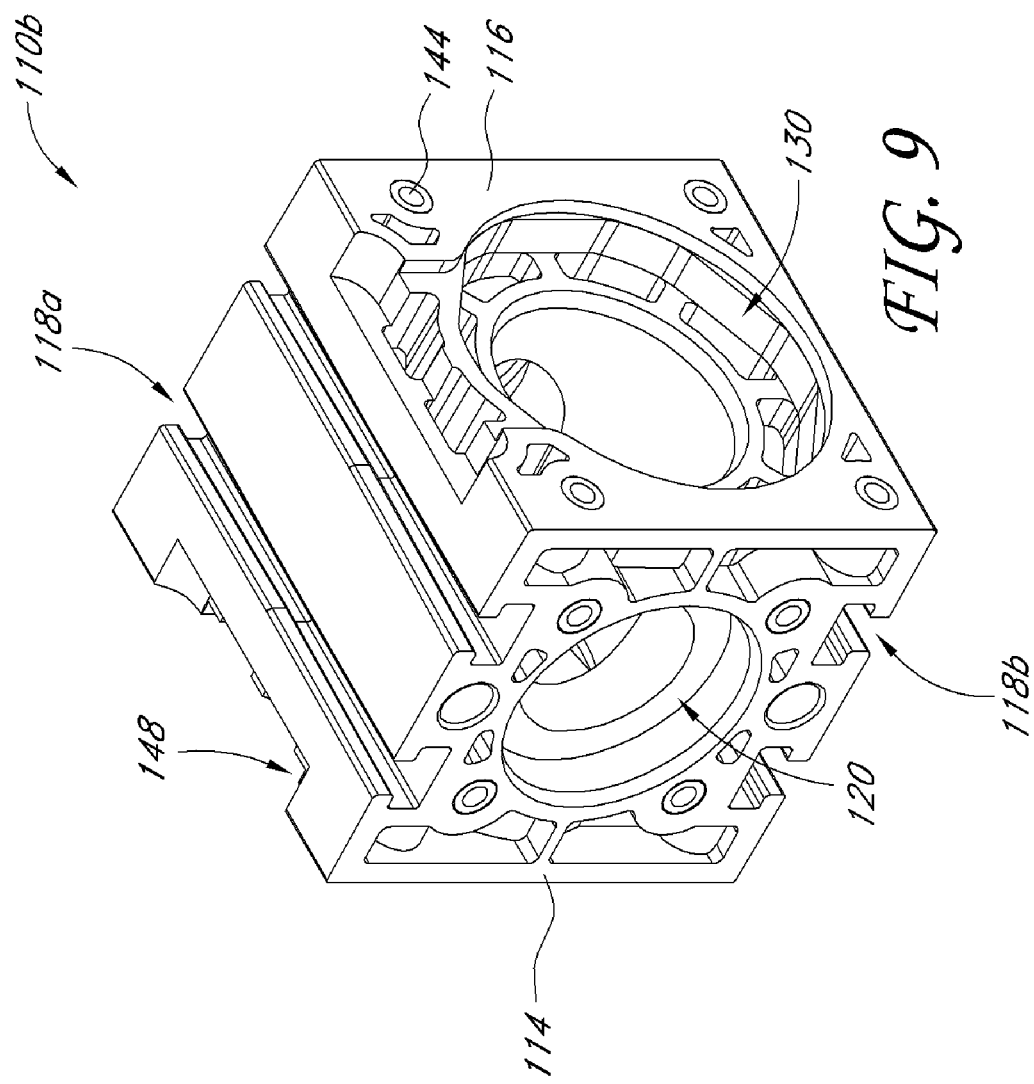
FIG. 9 is a perspective view of yet another embodiment of a manifold module.

With additional reference to FIG. 8, one embodiment of a module 110c has six valve ports 130. The six port module 110c utilizes the same general configuration and attributes of the four port module 110a discussed in conjunction with FIGS. 6 and 7. FIG. 9 illustrates an embodiment of a module 110b having two valve ports 130. The two port module 110b preferably utilizes the same general configuration and attributes of the four port module 110a discussed in conjunction with FIGS. 6 and 7. For example, modules 110a and 110b share the same side port configurations and the same centerline distances between adjacent ports on the respective modules. Further, preferably when the modules 110a, 110b are joined end-to-end, the centerline distance between adjacent ports of the adjoined modules (an inter-module centerline distance) is the same as the centerline distance between adjacent ports on the respective modules (an intra-module centerline distance). It should be understood that a plurality of standard-sized modules 110, such as two-port, four-port, six-port, eight-port, and so on, can be combined as desired to create a manifold body of nearly any desired size and port count. Addition of a selection of specialized modules having unique configurations and/or purposes expands the manifold customization possibilities even further.

Figure 10:
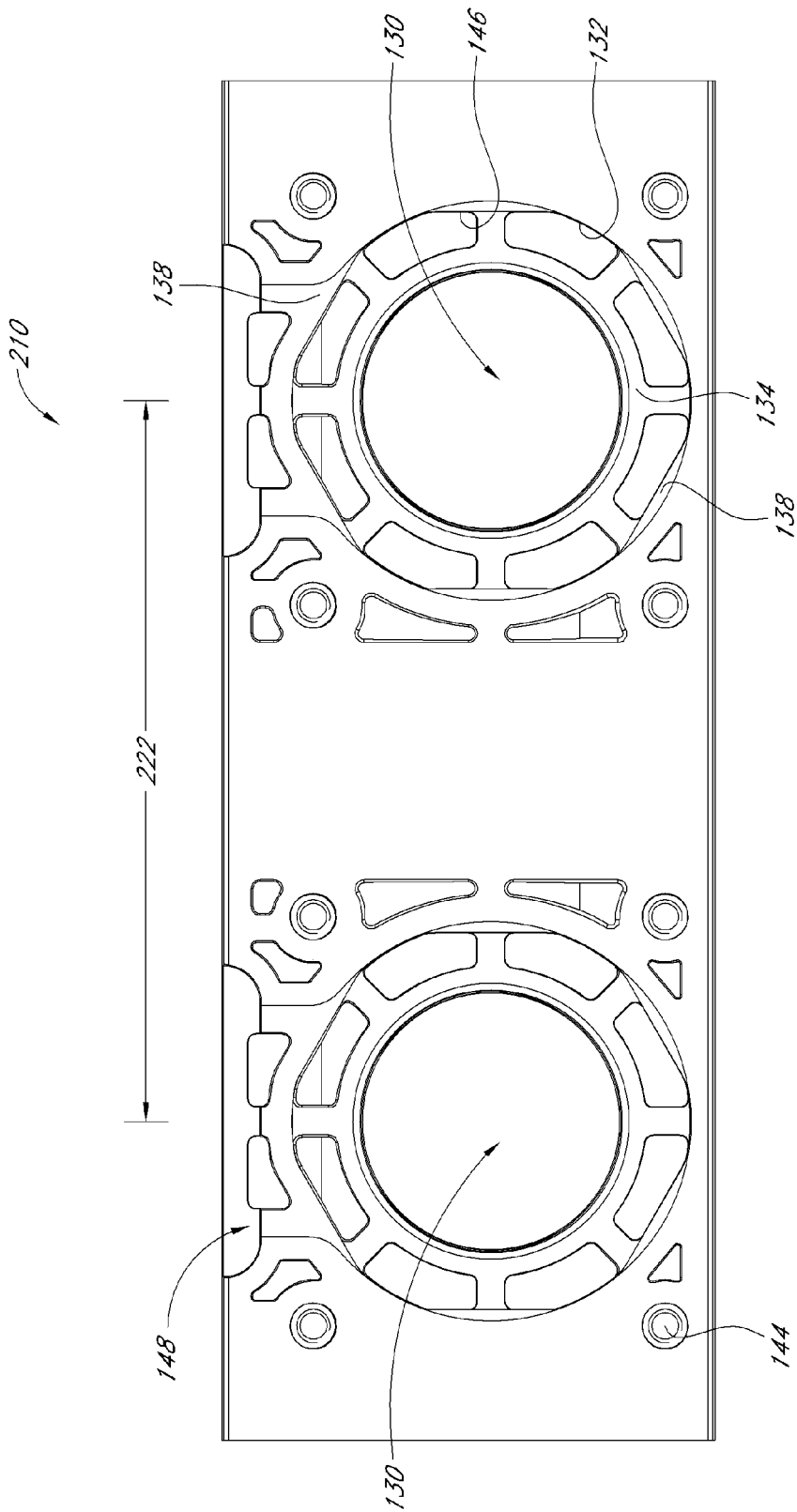
FIG. 10 is a side view of still another embodiment of a manifold module.

FIG. 10 illustrates another embodiment of a four-port module 210 configured to be joined with other modules 110 having a differing configuration. The module 210 preferably utilizes the same valve port 130 and end port 120 structures discussed in conjunction with FIGS. 6 and 7. However, in the illustrated embodiment the module 210 has been lengthened, and an intra-module centerline distance 222 between valve ports 130 of the illustrated modules 210 is greater than an intra-module centerline distance 122 of modules 110. Such an increased centerline distance enables the manifold module 210 to accommodate wider valves or another type of fluid-handling apparatus without interfering with other valves engaged with an adjacent port.

Notwithstanding the difference in shape and size of modules 110 and 210, the modules preferably may be coupled together in virtually any combination to form a manifold body that is configured specifically for a particular application and which may accommodate valves and/or other attachments of various sizes and shapes. In some embodiments, the inter-module centerline distance between ports on adjacent modules 110, 210 is a multiple (such as 2×, 3× or the like) of the intra-module center line distance 122 of a standard-sized module. Similarly, the intra-module centerline distance 222 can also be a multiple (such as 2×, 3× or the like) of the intra-module centerline distance 122.

The manifold module embodiments discussed above can be constructed according to various modes and procedures and of various materials. In the embodiments illustrated in FIG. 1-11, the modules 110 are injection-molded from a polymer. In accordance with such construction, the modules may include structural features such as cavities, ribs and the like as desired to reduce material use and mass while maintaining strength and durability as desired. Various polymers can be employed as desired. In other embodiments, the modules can be constructed in multiple steps that may or may not involve machining, and can employ other materials such as metals.

With reference next to FIG. 11, an embodiment of a module coupler 150 has an inner wall 154 and an outer wall 156. The inner wall 154 preferably defines a smooth, circumferential surface. The outer wall 156 has a first annular groove 158a and a second annular groove 158b. Each annular groove 158 is configured as a seat to accommodate a sealing member 152 such as an elastomeric o-ring seated within the groove 158.

With additional reference again to FIGS. 5 and 6, the module coupler 150 is configured so that it creates a seal between the cavities 196 of adjacent modules 110 that are joined end-to-end. For example, in use the coupler 150 is sandwiched between the first and second modules 110a, 110b. As such, the sealing member 152 positioned in the first annular groove 158a engages the end port outer wall 124 of the first module 110a, and the sealing member 152 positioned in the second annular groove 158b engages the end port outer wall 124 of the second module 110b. The end port recessed faces 126 preferably engage and/or guide ends of the coupler 150 so as to self-adjust the coupler 150 into a reliable sealing position relative to both adjoining modules. As such, the cavities of coupled modules are combined to form a single sealed chamber.

The module coupler 150 preferably is sized so that the end faces 114 of the modules 110 are substantially flush when the coupler 150 is engaged between the modules, as in the manifold 100 of FIGS. 1-5. In some embodiments, one or more projections, such as pins, may extend from a module end face and be configured to engage and fit within a cavity formed in the end face of an adjacent module so as to support connection of the assembled modules and particularly to help distribute any torsional load that may be exerted on a module body 90.

With particular reference again to FIG. 5, each illustrated end cap 180 has a first end cap face 185, a second end cap face 184, an end cap adapter 182, and an end cap port 183. The end cap port 183 extends inwardly from the first end cap face 185 and through the length of the end cap. In this embodiment the end cap port 183 is threaded. The end cap adapter 182 extends outwardly from the second end cap face 184. An outer wall 186 of the end cap adapter 182 has an annular groove 187 that is configured to accommodate a sealing member, such as an o-ring 152. In additional embodiments one or both of the end caps can be configured to not have a port so as to prevent any fluid flow therethrough.

With additional reference again to FIGS. 6-10, the end cap 180 preferably is configured to couple with the end port 120 of any of the modules 110. The end cap adapter 182 extends into the end port 120 and the sealing member 152 positioned in the annular groove 187 of the end cap adapter 182 engages the end port outer wall 124 of the module 110 so as to form a seal. The end cap adapter 182 preferably is sized so that the second end cap face 184 fits flush with the end port face 114 when the end cap adapter 182 is engaged in the end port 120. Preferably the end cap 180 is attached to the end face 114 using bolts or the like. Further, preferably multiple attachment points are spaced about the circumference of the end port 120.

With reference next to FIGS. 5 and 12, the illustrated elongate manifold plate 190 comprises opposing faces 191, a plurality of fastener holes 195, and a plurality of valve adapter orifices 197. In this embodiment each valve adapter orifice 197 is substantially the same. The upper portion of each orifice forms two tabs 199 that define a space 193 therebetween.

Figure 13:
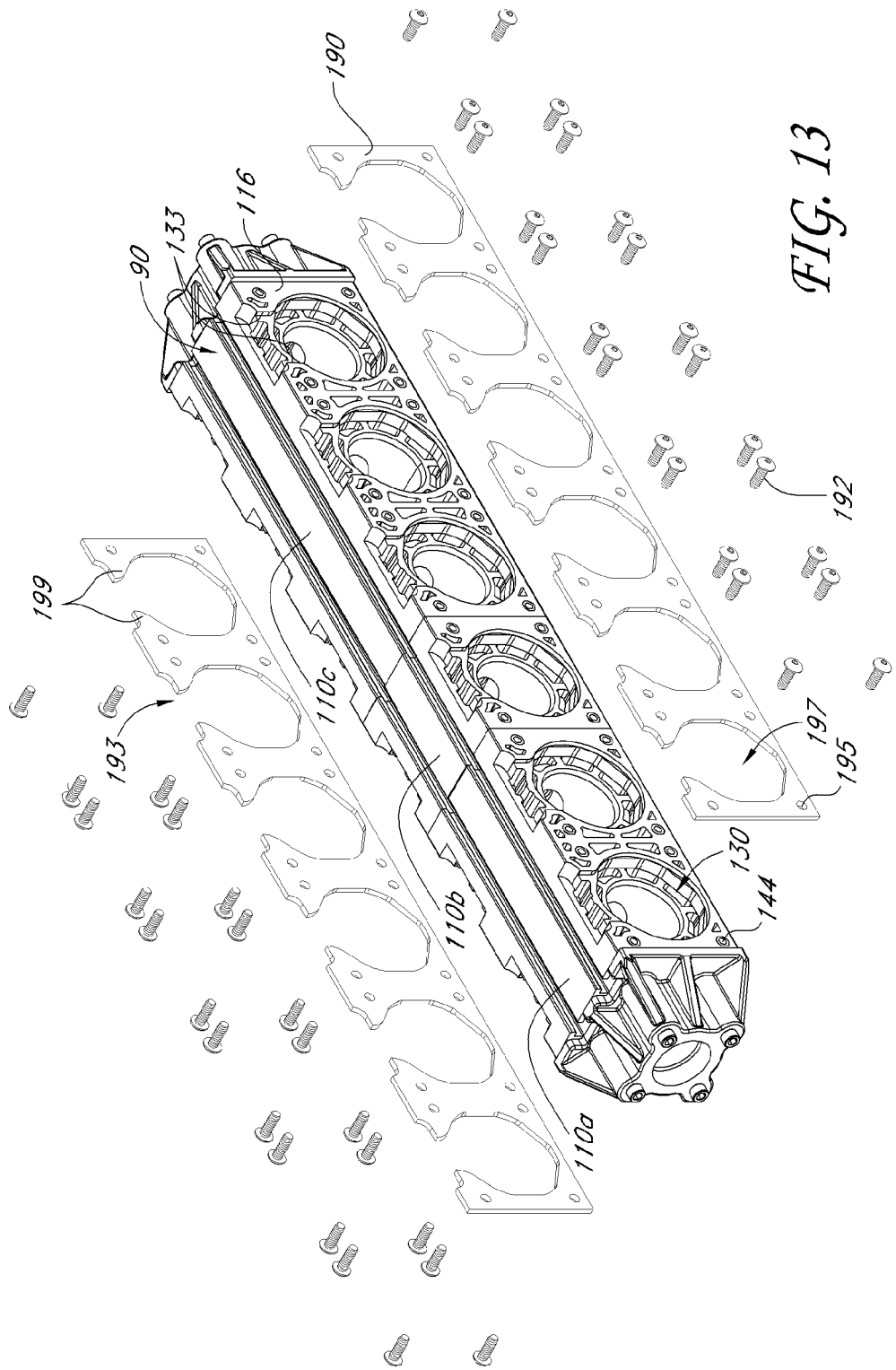
FIG. 13 is a partial exploded view of a manifold as in FIG. 1.
Figure 14:
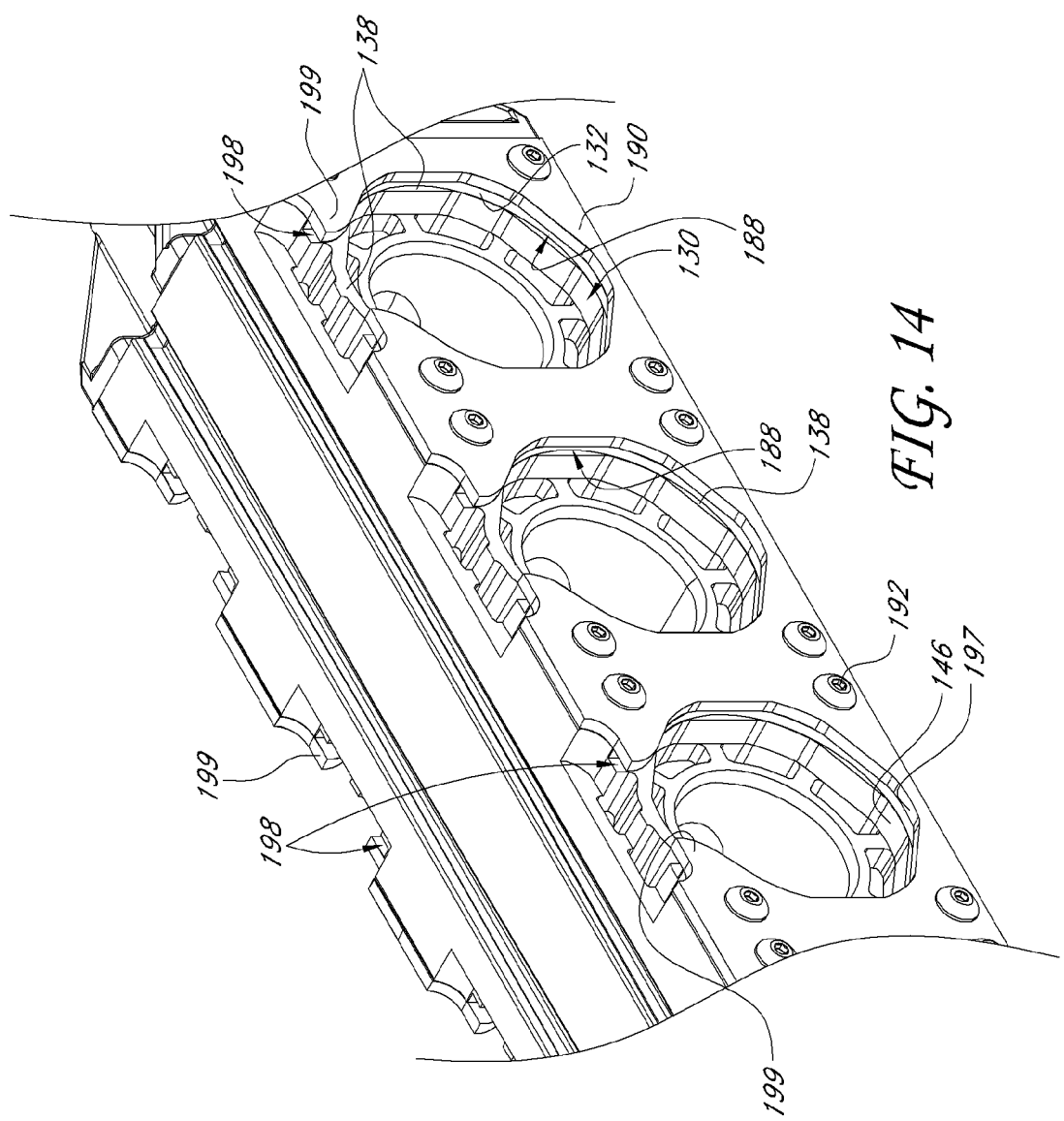
FIG. 14 shows the manifold body of FIG. 13 assembled.

With additional reference to FIGS. 13 and 14, once a manifold body 90 has been assembled by joining manifold modules 110 end-to-end, a pair of plates 190 are chosen having a length matching the assembled manifold body 90. A face 191 of each plate 190 is fit onto aligned side faces 116 of the manifold body, and once in place the plates 190 are secured to the modules using a plurality of fasteners 192.

As shown in FIGS. 1-5 and 13-14, preferably the plate spans across abutting end faces 14 of adjacent modules. As such, the plate 190 stabilizes and locks the position of the modules 110 relative one another and provides structural support for the manifold 100. Preferably the plate 190 is formed of a strong and durable material such as a structural metal. As such, the plates 190 function as reinforcing cladding for an assembled manifold body. In embodiments in which modules are formed of materials having a relatively low strength, such as many polymers, preferably the plates 190 are formed of a relatively rigid material having a greater modulus of elasticity than the material used to form the modules.

In the illustrated embodiment the elongate plates 190 match the length of the manifold body 90 and have six valve adapter orifices 197, one corresponding to each valve port 130. Preferably the plates 190 have the same number of valve adapter orifices 197 as there are valve ports 130 on the face of the manifold body 90. In some embodiments a single plate does not extend the full length of the manifold body, and instead plural plates 190 are secured to a side of the manifold body 90. Most preferably, however, adjacent modules are connected to the same plate so that the plate spans across the attached module ends 114. In other embodiments, multiple plates are secured on at least one of the sides of a manifold body made up of a plurality of modules. In one such embodiment at least one of the plates spans the entire length of one of the modules plus at least one valve port of the adjacent module. In another such embodiment at least one of the plates spans at least one port of two connected modules.

With continued reference to FIGS. 12-14, each valve adapter orifice 197 preferably is similar in shape to the corresponding valve adapter interface wall 146 of the valve port 130, with the exception of the tabs 199 formed on the upper portion of the orifice 197. The space 193 between the tabs 199 is less than the space 135 between the upper portions 133 of the first wall 132. This creates a pocket 198 between the second recessed face 138 and the tabs 199. Additionally, plural further pockets 188 are defined between the plate 190 and the portions of the second face 138 disposed about the interface 146.

FIGS. 15A-15C illustrate additional embodiments of module couplers. Preferably, each of the embodiments of the couplers 250, 350, and 450 employ substantially the same outer wall structure 156 employed by the coupler 150 illustrated in FIG. 11, and similarly fit sealingly between adjacent modules joined end-to-end. In the embodiment illustrated in FIG. 15A the coupler 250 comprises a substantially solid wall 254 so that fluids are blocked from flowing through the coupler 250. In the coupler 350 illustrated in FIG. 15B a flow-limiting orifice 356 is defined by a thickness of an inner wall 354. The size and/or shape of the orifice 356 affects the fluid flow rate through the coupler 250, and may be chosen to limit such fluid flow as desired.

In the coupler 450 illustrated in FIG. 15C a fluid filter 454 substantially fills an orifice 456. The filter 454 may be any type of fluid filter, including a selectively permeable membrane. In some embodiments a filter similar to the filter 454 may be used in conjunction with the flow limiting coupler 350 illustrated in FIG. 15B. It is to be understood that other coupler embodiments may be provided to serve purposes as desired. For example, yet another embodiment of a coupler may include a chemical layer that leaches at a desired rate into fluid passing therethrough.

FIG. 16 is an embodiment of a male flow blocker 550 such as for an end cap 180. The flow blocker 550 preferably has a threaded outer wall 556 and a substantially solid end wall 554. The outer wall 556 is configured to be threaded into the end cap port 183 to form a seal at the end cap 180. FIG. 17 is an embodiment of a female flow blocker 650 such as for a valve adapter 170. The flow blocker 650 has an outer wall 656 and a closed end wall 654. Preferably, an inner surface of the outer wall 656 is threaded so as to engage and form a seal with a threaded portion of a valve adapter 170.

With reference next to FIGS. 5, 18 and 19, the valve adapter 170 comprises a manifold engagement region 172, a valve engagement region 174, and an inner wall 169. The inner wall 169 defines an internal passage 171, which extends through the entire length of the valve adapter 170. The adapter 170 can be constructed of a wide range of materials, depending on factors such as anticipated manifold pressures, fluid content, cost and/or other factors. In one embodiment the adapter is made of an injection-molded polymer. In another embodiment the adapter is machined out of a metal. Still further embodiments may employ combinations of materials such as polymers, metals and ceramics. Additionally, adapters of various material makeup can be used simultaneously with a single manifold.

The manifold engagement region 172 has a manifold engagement member 176 with opposing first and second faces 177, 179. In this embodiment the engagement member 176 is generally hexagonal when viewed from an end of the valve adapter 170, as illustrated in FIG. 19. In some embodiments the engagement member 176 may be another geometric shape, such as a square, octagon, ellipse, or other symmetrical or asymmetrical shape. Preferably, however, the engagement member 146 is shaped complementary to the valve adapter interface 146 of the module valve port 130 so that the engagement member 176 will align with and seat within the interface 146, and their engaged non-circular shapes will interfere with and prevent rotation relative to one another.

A first projection 173 extends outwardly from the first face 177 of the engagement member 176. An annular groove 175 is formed in the first projection 173. Preferably the annular groove 175 is configured to accommodate a sealing member 152, such as an o-ring, as shown in FIG. 21.

The valve engagement region 174 has a second projection 181 that extends outwardly from the second face 179 of the engagement member 176. In the illustrated embodiment the second projection 181 is elongate and has an externally threaded portion 189, thus defining a male connection.

FIG. 20 illustrates another embodiment of a valve adapter 270. The valve adapter 270 comprises a valve engagement region 274 and a manifold engagement region 172. The manifold engagement region 172 of the illustrated valve adapter 270 shares substantially the same structure as the valve adapter 170 discussed in connection with FIGS. 18 and 19. The valve engagement region 274 has a second projection 276 that extends outwardly from the second face 179 of an engagement member 176. In the illustrated embodiment the second projection 276 comprises an internally threaded portion 289, and thus defines a female connection.

With continued reference to FIGS. 18 and 19 and additional reference to FIG. 21, the valve adapter assembly 194, comprising the valve adapter 170, the sealing member 152, and a locking member 160, is illustrated in conjunction with a valve 260. The illustrated locking member is a snap ring 160 having a generally circumferential body 164 and two heads 162. A space 167 is defined between the heads 162. The body preferably is generally planar, having a thickness in an axial direction and a width in a radial direction. Preferably the body width is substantially greater than its width. Each head has an upwardly extending portion 163, which on one end transitions to the body 164 and on the other end transitions into a top portion 165. The snap ring preferably bends in the transition portion so that the top portion is disposed in a different plane than is the upward portion 163 and the body 164. Preferably the top portion lies in a plane oriented about 90° relative the body. Each top portion 165 preferably has a hole 166. The body portion 164 is generally circular until it transitions to the upward portion 163. Also, in the illustrated embodiment, the width of the body portion 164 decreases in the area approaching the upward portions 163 so that the region of the body portion opposite the heads 162 has the greatest width.

The illustrated valve 260 represents a typical fluid valve, which can have a wide variety of specific configurations, and preferably comprises a valve controller interface 262, a valve body 264, a valve inlet 266, and a valve outlet (not shown). In the illustrated embodiment the valve inlet 266 has an internally threaded region 268. The valve controller interface is configured to connect to an external electronic controller, which controls operation of the valve 260.

The valve adapter 170 is configured to couple with the valve 260. In this embodiment the threaded region 189 of the valve adapter 170 engages the threaded portion of the valve inlet 268. Preferably a sealing member, such as Teflon tape, is applied to the threaded region 189 of the valve adapter 170 before it is threaded into the valve threaded region 268 to help form a seal between the valve 260 and the valve adapter 170. The valve adapter 170 is then threaded into the valve 260 until it is sufficiently tight to form a seal.

Figure 22:
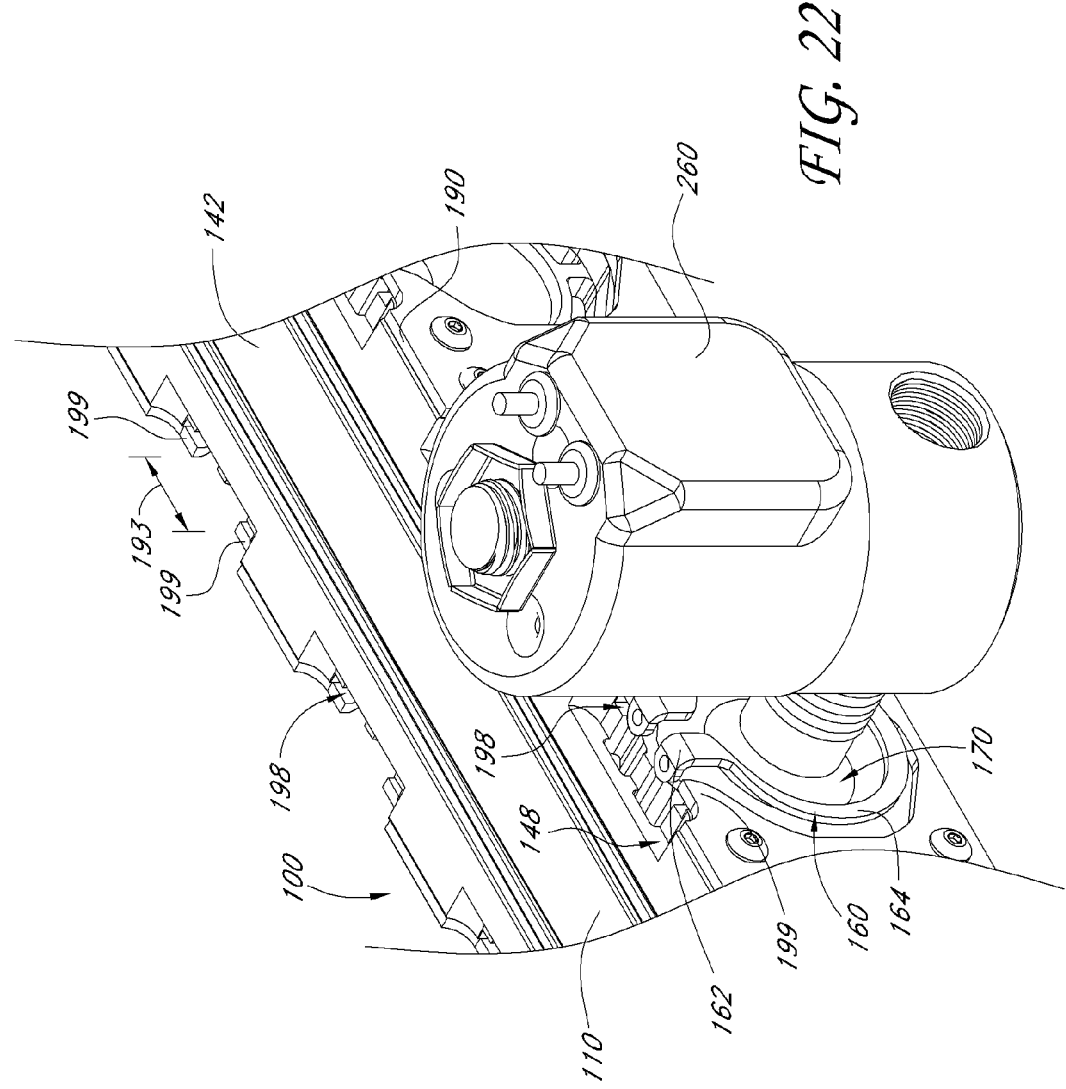
FIG. 22 shows an assembled valve adapter assembly as in FIG. 21 at a point during installation onto a manifold as in FIG. 14.
Figure 23:
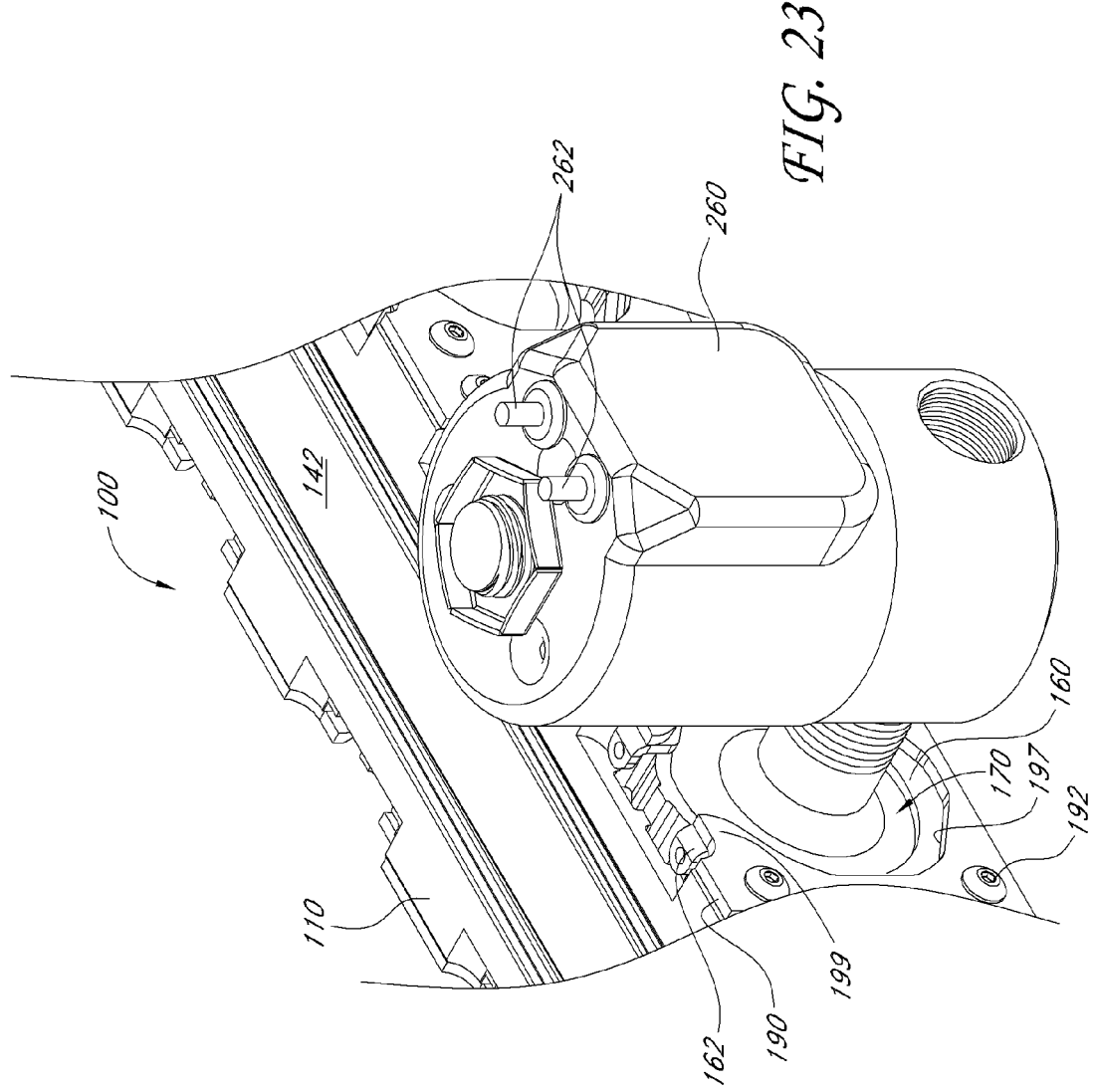
FIG. 23 shows the apparatus of FIG. 22 with the valve adapter assembly installed.

As discussed above, and with additional reference to FIGS. 14 and 22, the manifold engagement member 176 of the adapter 170 is shaped to fit complementarily through the valve port orifice 197 of the plate 190 and into the valve adapter interface 146 of the manifold. As such, the valve adapter 170 preferably is properly rotated so as to be aligned with the interface 146 in preparation for engaging the adapter 170 and attached valve 260 with the manifold. Preferably, however, the valve 260 is first or concurrently rotationally adjusted relative to the adapter 170 so that the valve has a preferred orientation (for example vertically upright) relative to the manifold when the valve adapter 170 engagement portion 176 is properly aligned with the interface 146. To effect such alignment, the valve adapter 170 is further rotated relative to the valve 260 (preferably in a tightening direction) after initial tightening until the valve is suitably aligned.

The degree of rotation of the valve 260 relative to the adapter 170 necessary to achieve proper alignment of the adapter engagement portion 176 to the interface 146 concurrent with a desired orientation of the valve 260 is generally determined by the shape of the manifold engagement member 176. In the illustrated embodiment, due to its symmetrical generally-hexagonal shape, proper alignment will be obtained by additionally rotating (tightening) the valve 260 onto the valve adapter 170 no more than 60° from any rotation position. In order to maintain a proper seal, preferably any such additional rotation is in a tightening direction. Preferably shapes of the manifold engagement member 176 and valve adapter interface 146 are chosen to limit the maximum additional rotation needed to achieve proper alignment to no more than about 90°, more preferably no more than about 75°, and most preferably no more than about 60°.

With particular reference now to FIGS. 5, 6, 14 and 21-23, to connect the valve 260/adapter 170 to the manifold 100, the valve adapter 170 is aligned with a desired one of the valve ports 130 of the manifold body 90, and advanced through the valve port orifice 197 and into the port 130 so that the first face 177 engages and/or generally abuts the first recessed face 134 and the manifold engagement member 176 is registered with the valve adapter interface 146. In this configuration, the first projection 173 extends past the first recessed face 134 so that the sealing member 152 on the first projection 173 engages the first interior wall 136 of the port 130. As such, a sealed passage 171 through the valve adapter 170 connects the valve 260 to the cavity 196 of the manifold 100. Also, since the manifold engagement member 176 is registered with the valve adapter interface 146, the valve adapter 170 is prevented from rotating relative to the valve port 130.

Once the valve adapter 170 is in place in the port 130, the locking member 160 is next installed so as to maintain the valve adapter 170 in place. With specific reference now to FIG. 22, to place the locking member, which in this embodiment is a snap ring 160, the heads 162 of the snap ring 160 are squeezed together, compressing the snap ring 160 sufficiently so that the heads 162 will fit through the space 193 between the tabs 199 of the plate 190. Such compression also enables the body 164 of the snap ring 160 to fit through the valve adapter orifice 197 of the plate 190. In a preferred embodiment the locking member 160 can be manipulated using pliers or another tool that engages the heads 162. Since the heads 162 in the illustrated embodiment lie in a plane generally perpendicular to the locking member body 164, the locking member 160 may be viewed from above, and approached and manipulated on a different plane than the valve 260. In some embodiments an installation tool is configured to approach the locking member 160 from above and to engage the holes 166 on top of the heads 162. In other embodiments the heads 162 may be sufficiently enlarged to accommodate manual operation with a user's fingers.

The compressed locking member 160 is advanced through the space 193 and valve adapter orifice 197 until it has completely passed through the plate 190 and is engaged with and/or adjacent to the second face 179 of the valve adapter 170. When the heads 162 of the locking member 160 are released, the snap ring 160 will decompress and expand outwardly. The heads 162 will expand into the pockets 198 between the second recessed face 138 and the tabs 199. The body 164 will expand into the further pockets 188 defined between the discontiguous portions of the second face 138, the first outer wall 132 and the plate 190. As such, the locking member 160 is interposed between the module and the plate. Also, the adapter 170 is interposed between the module and the locking member.

The smooth, generally circular shape of the first outer wall 132 is especially amenable to accommodating expansion of the similarly-circular snap ring body 164, and thus the snap ring becomes wedged between the valve adapter 170 and the plate 190 continuously or at least at multiple locations (which can be considered support points) about the adapter's circumference, thus preventing the valve adapter 170 and associated valve 260 from disengaging from the valve port 130.

The snap ring 160 being wedged between the adapter 170 and plate 190 at multiple locations about the adapter's circumference also helps maintain the adapter in a desired orientation, namely a perpendicular orientation, relative to the valve port 130, which may help maintain a consistent seal. Preferably the locking member is wedged between the adapter and the plate at least one support point in each hemisphere about an axis of the adapter. More preferably there is at least one support point in each 120° block of rotation about the axis, and even more preferably there is at least one support point in each 90° block of rotation about the axis. Most preferably there is at least one support point in each 60° block of rotation about the axis.

In the illustrated embodiment, the plate 190 is connected to the side face 116 at four locations about the circumference of each valve port 130. These connections to the module reinforce the plate, particularly immediately about the circumference of the valve adapter orifice 197, and the plate is securely attached at and adjacent each valve port. The multiple localized connections of plate and module about the port help to minimize plate deflection under load, and thus maintain the locking member 160 and adapter 170 in a snug, still position relative to the manifold 100. In the illustrated embodiment four such plate/module connections are disposed about each valve port valve port 130/adapter orifice 197, such that an attachment point is disposed in each 90° block of rotation about the valve port axis. Preferably at least one plate/manifold attachment is disposed in each 180° block of rotation about the valve port axis, more preferably in each 120° block of rotation about the valve port axis, and most preferably in each 90° block of rotation about the valve port axis as in the illustrated embodiment.

The valve adapter assembly 194 and associated valve may be removed from the manifold by first removing the locking member by pushing the heads 162 together and removing the locking member 160 from its position wedged between the valve adapter 170 and the plate. The valve adapter 170 (and associated valve 260) can then be easily pulled axially from the valve port 130 to which the valve adapter was mounted. This allows the valve to be connected or disconnected from the manifold 100 without first disconnecting the valve 260 from the valve adapter 170, without any threading action of the valve 260 relative to the manifold 100, and without interfering with any other valves that may be mounted on the manifold.

Figure 28:
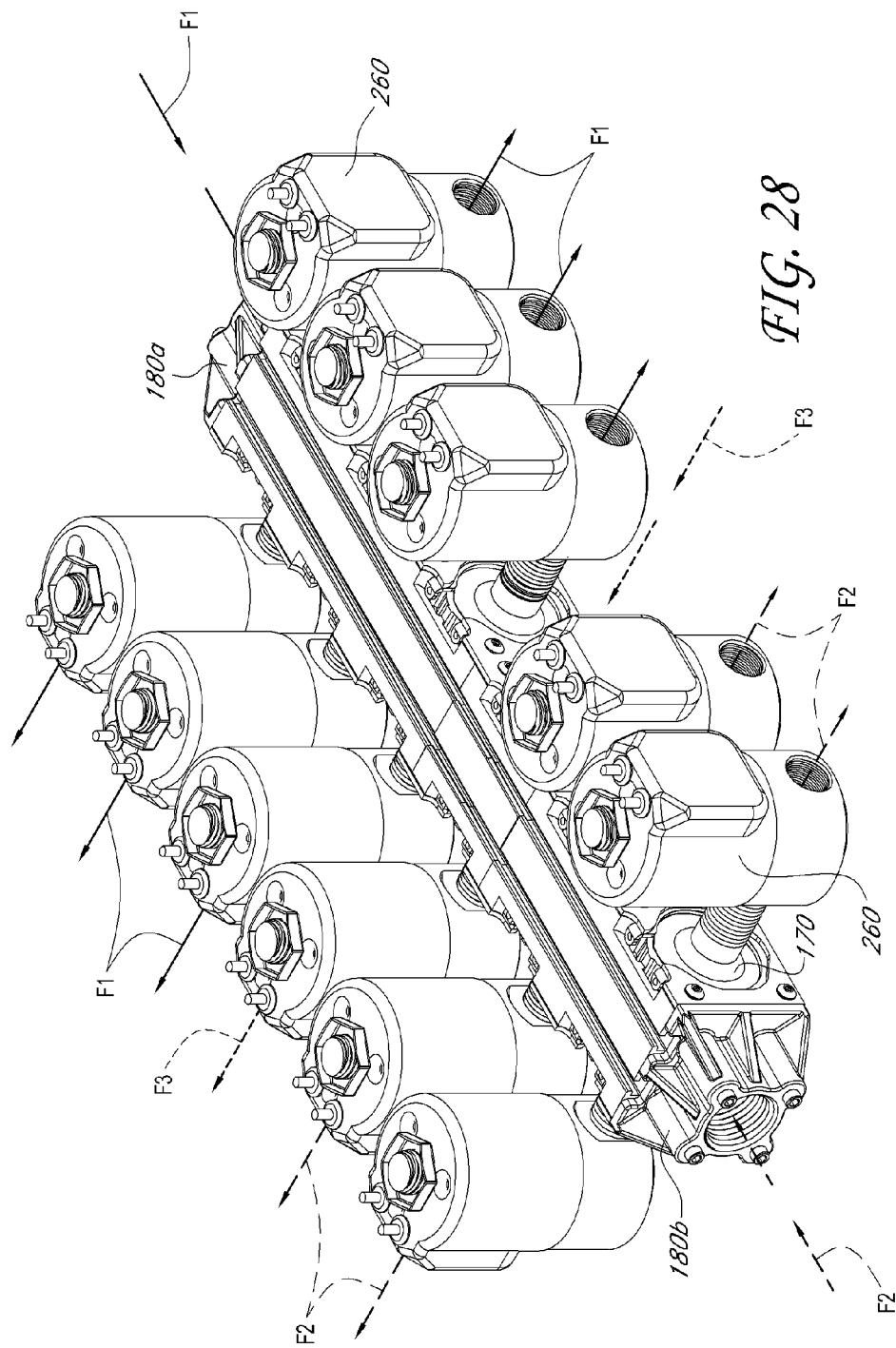
FIG. 28 shows one embodiment and configuration of a manifold with valves in place.

With additional reference to FIG. 28, it is to be understood that the structure and methods described herein are particularly amenable to providing and operating manifolds that flexibly accommodate valves that can be tightly packed. For example, in a preferred embodiment the valve ports are sufficiently close to one another so that a valve connected to the manifold cannot be rotated significantly without contacting and being prevented from further rotation by the adjacent valve. Put another way, the centerline distance between adjacent ports preferably is not much greater than a width of a valve mounted in the port. In some embodiments the centerline distance is no more than 20% greater than the valve width. More preferably the centerline distance is no more than about 15% or even 10% greater than the valve width. Most preferably the centerline distance is no more than about 5% greater than a standard valve width. As such, valves can be tightly packed on the manifold, and since the adapters attach and detach from the manifold by moving axially into and out of engagement with respective ports, such tightly packed valves can still be individually installed and removed from the manifold.

Figure 24:
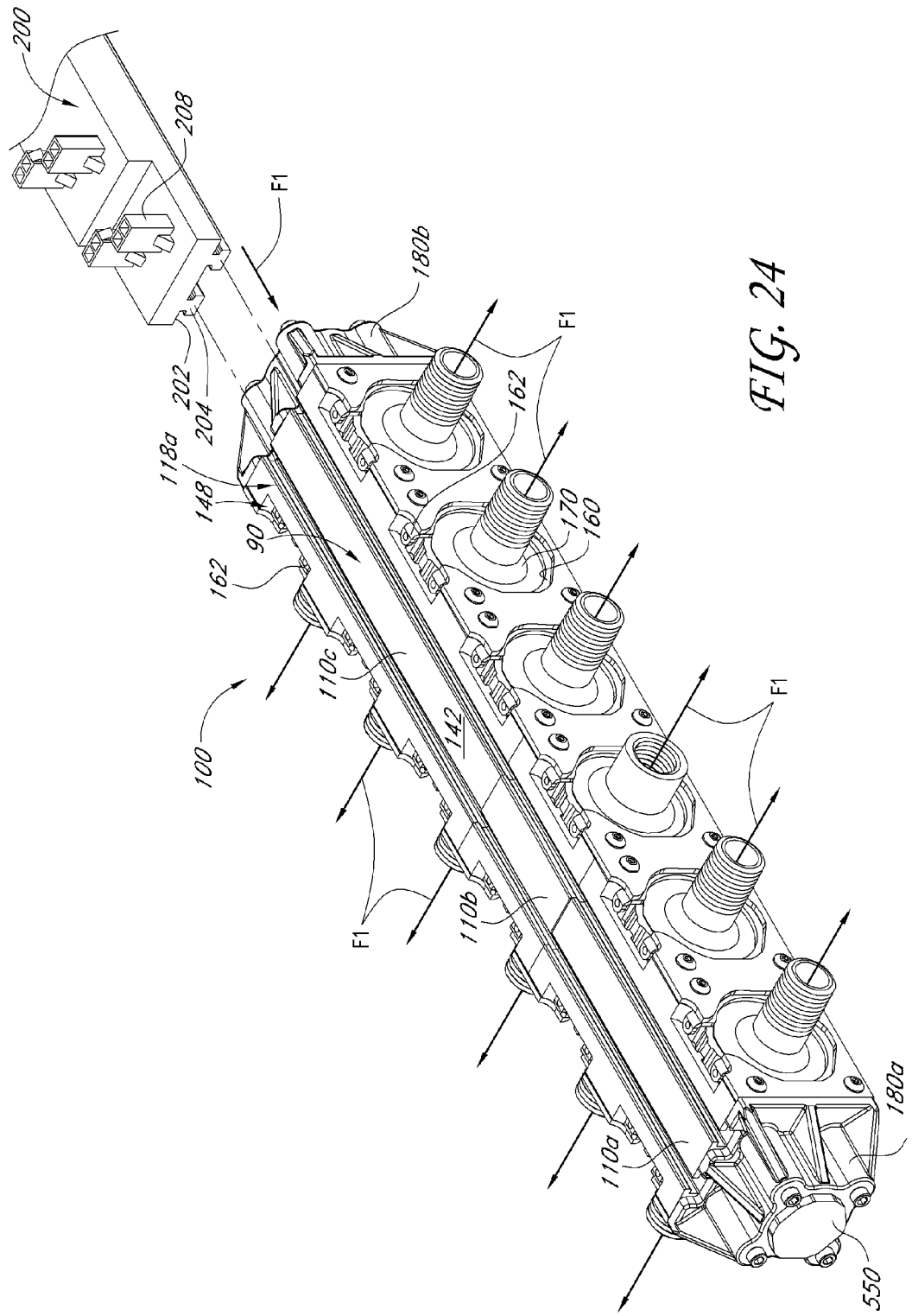
FIG. 24 illustrates fluid flow of an embodiment of a manifold in first configuration.

With reference again to FIGS. 22 and 23, and additional reference to FIGS. 1 and 24, when the illustrated snap ring 160 is installed, the heads 162 are seated within the top recess 148 so that they do not protrude above the top face 142. As such, the top face 142 maintains an uninterrupted face upon which an attachment such as a controller 200 or the like can slide without interference.

For example, FIG. 24 schematically shows a controller 200 having a bottom surface 202 from which elongate mounts 204 extend. The illustrated elongate mounts 204 are shaped to fit slidingly in the top slots 118a of a manifold 100 so that the controller bottom surface 202 rests upon and slides over the manifold top surface 142. In some embodiments the controller 200 connects to a wire harness and comprises wire mounts 208 that can receive wires that connect to the valve controller interfaces 262. In further embodiments the controller 200 can comprise a processor and/or receive wireless instructions, sensor data, or the like so as to control valve operation. Since no part of the locking members 160 extend beyond the top surface 142 in this embodiment, installation of the controller 200 is not hindered by the locking members.

In the illustrated embodiment the manifold bottom face 128 is also preferably uninterrupted by any locking member or the like, and similarly can accommodate an apparatus slidingly attached thereto. For example, in one embodiment a manifold mount is configured to support the manifold. More specifically, the manifold mount is configured to stand independently or be attached to another structure, and also comprises a mount member configured to slidingly engage the bottom slots 118b and support the manifold from the bottom surface 128. Thus, in some embodiments a manifold as described herein can have a first structure attached to its top surface and a second structure attached to its bottom surface.

In yet another embodiment a snap-ring-type locking member can be configured with its head bent in a direction substantially opposite the configuration in the illustrated embodiment. As such, although the locking member still does not break the plane of the top surface 142 of the manifold, a portion of each head extends outwardly from the side surface 116 and past the plate 190, and is accessible so that a user can actuate the heads and attach or remove a valve adapter without disturbing an apparatus such as a controller that may be attached to the top surface. Other shapes and configurations of compressible rings may also be used in other embodiments, and ports having somewhat different structure configured to match such ring configurations are contemplated.

FIGS. 1-5 and 24 illustrate operation of a manifold 100 configured in accordance with one embodiment. In this embodiment the manifold body 90 has a single cavity that extends through the body 90, which is made up of first, second and third modules 110a-c joined end-to-end. The cavity is open at end cap 180b but is closed at end cap 180a, which has an end cap flow blocker 550 in place. The manifold cavity fluidly connects the plurality of valve adapters 170 with end cap 180b.

Operation of the manifold in this embodiment is schematically illustrated by arrows representing a first fluid F1. In this embodiment the end cap 180b acts as a fluid inlet for the first fluid F1 and each of the valve adapters 170 is a fluid outlet. The fluid may be any fluid, such as a liquid or gas, and may originate from any conventional fluid source or fluid inlet. A fluid source is connected to the end cap 180b such as through a threaded connector and the fluid F1 flows into and through the cavity and through each of the adapters 170. Preferably the adapters are each coupled to a valve or other fluid outlet control unit that regulates fluid flow as desired. The fluid flow may be regulated at the inlet and each of the outlets, or any combination of inlet and outlets.

Figure 25:
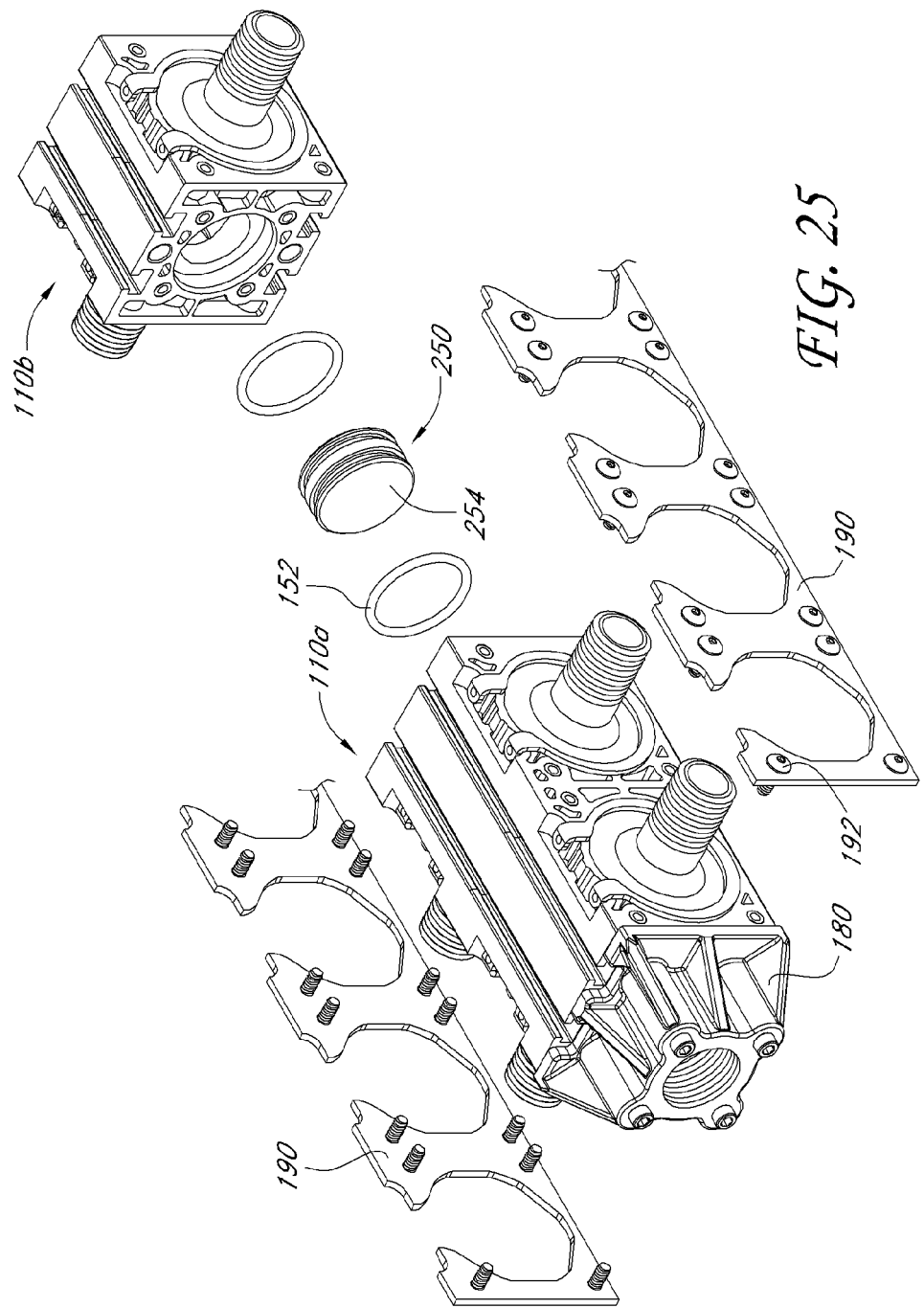
FIG. 25 shows a step in a process of changing the configuration.
Figure 26:
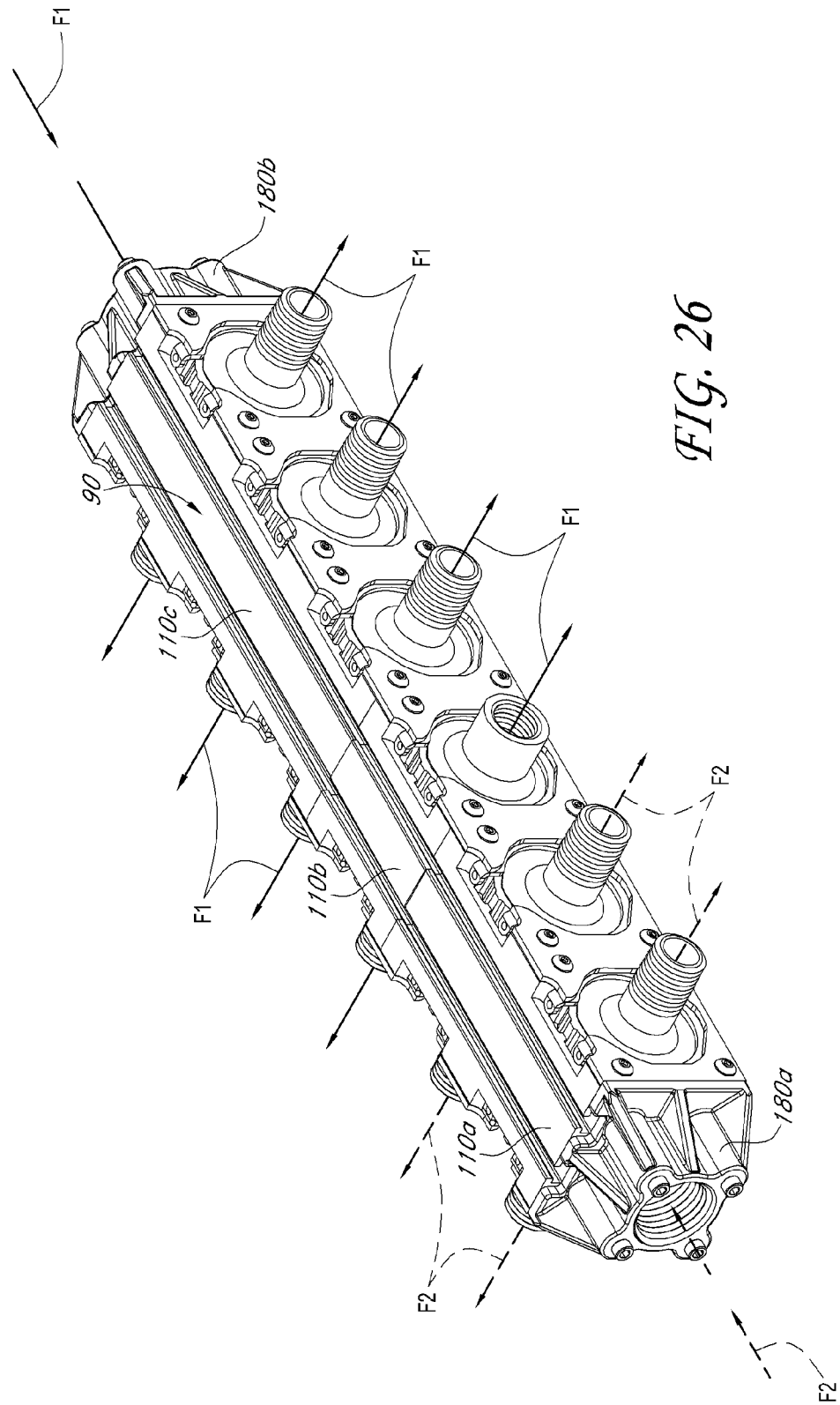
FIG. 26 illustrates fluid flow of manifold of FIG. 24 in a second configuration.

With reference next to FIGS. 25 and 26, the manifold can easily be reconfigured. For example, the first and second modules 110a, 110b can be decoupled as shown in FIG. 25, and a manifold blocker 250 (see FIG. 15A) can be installed therebetween.

The manifold blocker 250 divides the manifold cavity into a first manifold cavity and a second manifold cavity that do not fluidly communicate with each other. In this embodiment the first end cap 180a functions as an inlet for a first fluid F1 and the valve ports of the second and third modules 110b, 110c function as first fluid outlets. The second end cap 180b functions as an inlet for a second fluid F2, and the valve ports of the first module 110a function as second fluid outlets. The second fluid F2 flows into the second cavity and out the second fluid outlets. As such, the first fluid inlet regulates flow of the first fluid F1 independent of the flow of the second fluid F2 and the second fluid inlet regulates flow of the second fluid F2 independent of the flow of the first fluid F1. Additionally each fluid outlet independently regulates the flow of their respective fluid.

Figure 27:
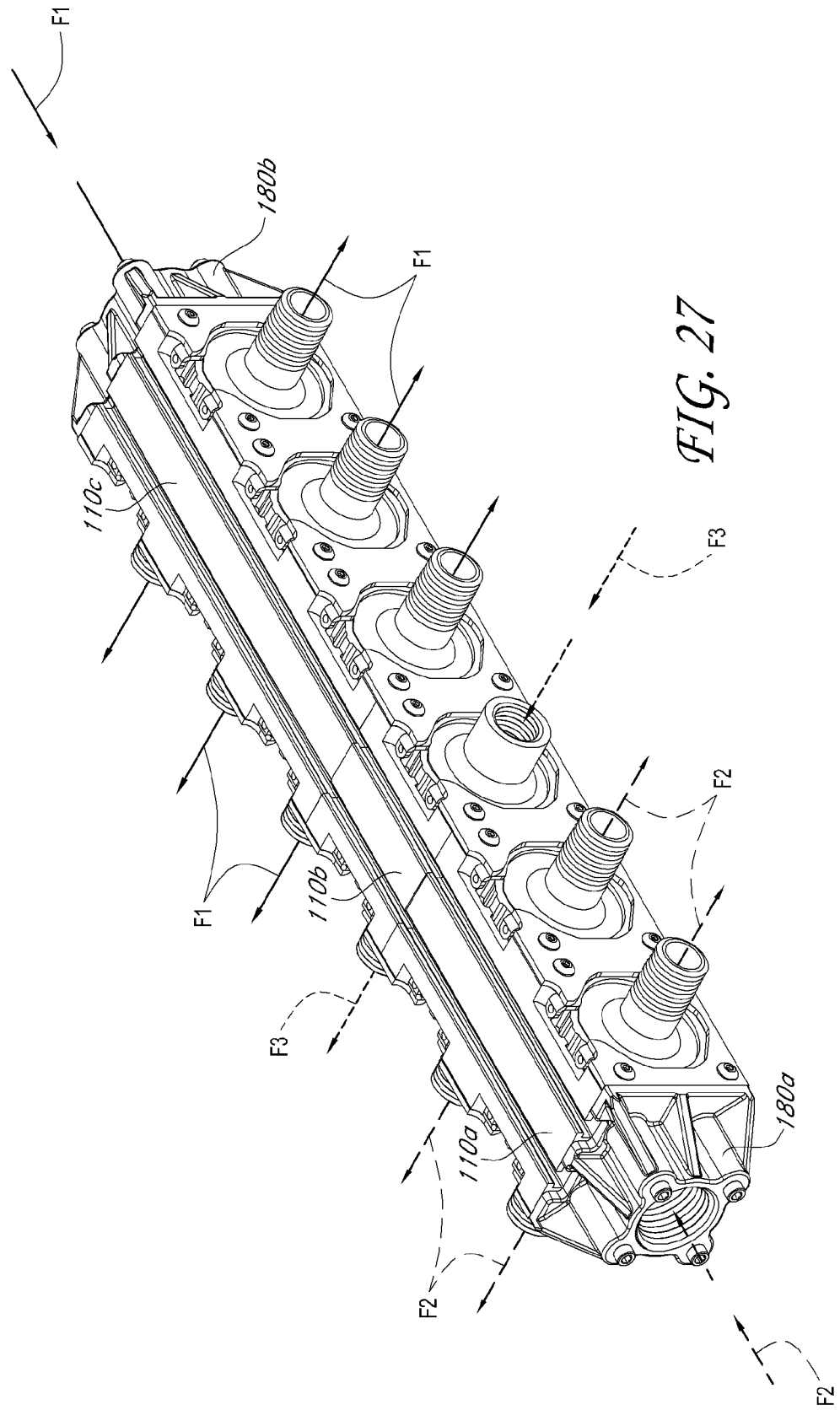
FIG. 27 illustrates fluid flow of the manifold of FIG. 24 in a third configuration.

FIG. 27 shows the manifold 100 reconfigured in accordance with another embodiment. A flow blocker 250 has now been positioned between the first and second modules 110a, 110b and a second flow blocker 250 has been positioned between the second and third modules 110b, 110c. Thus, the manifold cavity is divided between a first manifold cavity, a second manifold cavity and a third manifold cavity. The second end cap 180a functions as a first fluid inlet, the first end cap 180b functions as a second fluid inlet, and a valve adapter 270 coupled to a valve port in the second module 110b functions as a third fluid inlet. A first fluid F1 enters the first fluid cavity through the second end cap 180b and exits through corresponding valve adapters, a second fluid F2 enters the second fluid cavity through the first end cap 180a and exits through corresponding valve adapters, and a third fluid F3 enters the third fluid cavity through the adapter 270 and exits through a corresponding valve adapter. The first, second, and third cavities are not in fluid communication and the first, second, and third fluid inlets regulate the flow of their respective fluids independently of each other. Additionally each fluid outlet independently regulates the flow of its respective fluid.

The first, second and third fluids F1, F2, F2 in the above examples typically have some difference in their properties. For example, they can be the same compound, element, mixture or the like, but at a different pressure and/or in a different phase, or they may be entirely different compounds. For example, F1 could be oxygen at 15 psi, F2 could be oxygen at 30 psi, and F3 could be nitrogen at 20 psi. Nevertheless, it is contemplated that there may be occasions when identical fluid compounds at identical pressures may be desired to be handled differently for various reasons.

FIG. 28 illustrates the manifold configuration of FIG. 27 but with valves 260 coupled to the valve adapters 170. In the illustrated embodiment all of the valves 260 look the same. However it is to be understood that each of the valves can have unique characteristics, such as a specific flow rate, control routine or the like. Also, valves of various shapes, sizes, connection structures and flow characteristics can be employed.

As can be appreciated, the principles discussed herein provide tremendous versatility to assemble customized manifolds from standard, inexpensive parts. For example, with reference next to FIG. 29, an embodiment of a manifold 300 is shown, which manifold is configured to accommodate six valves 260. The illustrated manifold employs one four-port module 110a and one two-port module 110d. The two-port module 110d is configured with a greater distance between valve port centers than has the four-port module 110a.

Figure 29:
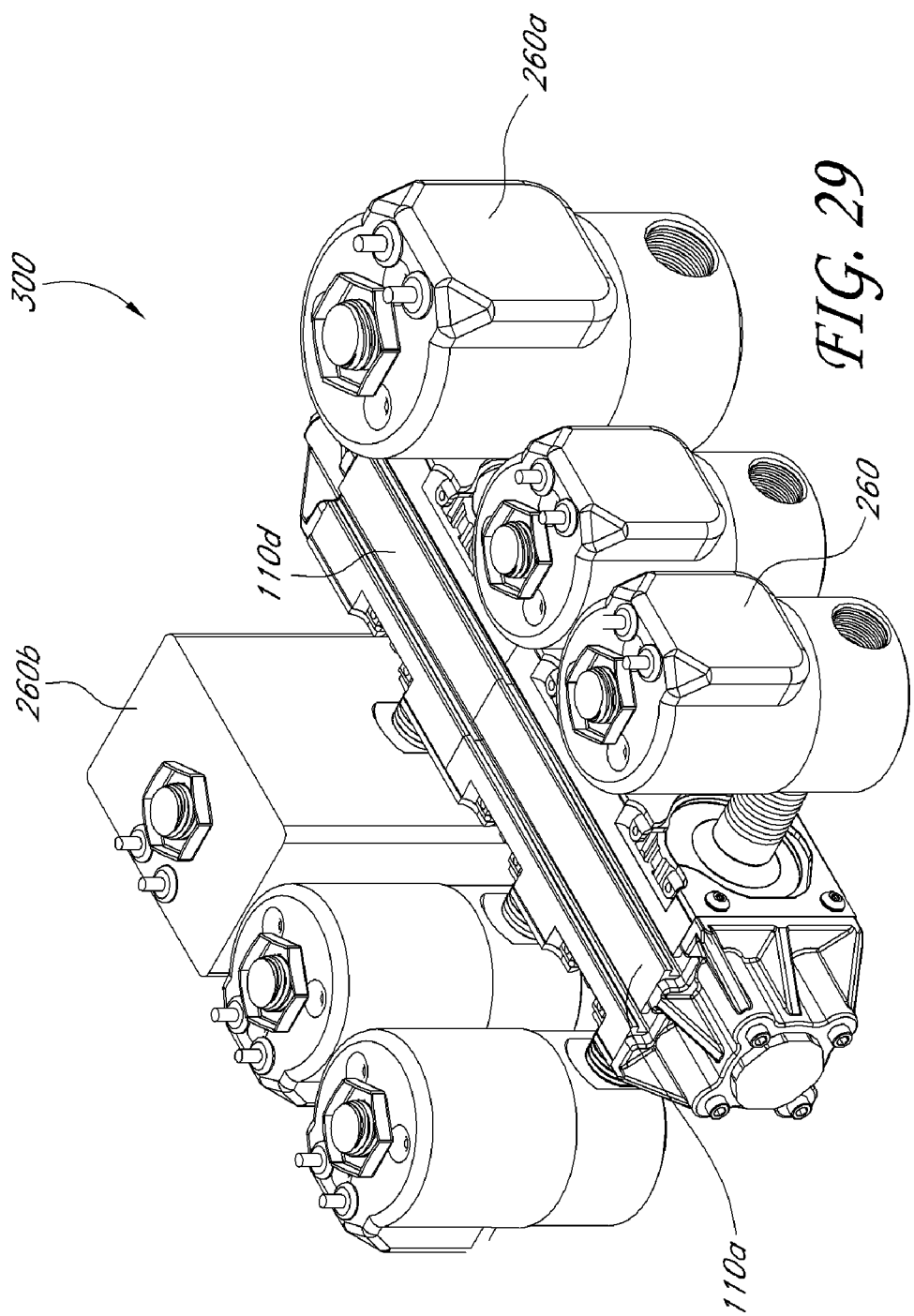
FIG. 29 shows another embodiment and configuration of manifold with valves in place.

In the example configuration shown in FIG. 29, the two-port module 110d accommodates a comparatively large valve 260a which exceeds the size and, presumably, capacity of the other valves 260, and a secondary valve 260b having a configuration that is different from others of the valves. For instance, the secondary valve 260b may have a shape that is proprietary to a particular vendor, and/or may be sized and shaped for a particular use. Such a secondary valve 260b may not only be different in size, but may also have a unique inlet structure. Thus, a corresponding valve adapter preferably comprises a valve engagement region 174 that is specially configured to engage the particular size and style of the secondary valve's inlet, but also has a manifold engagement region 172 that is configured to engage the standard-sized manifold valve port 130. As such, by providing adapters having a variety valve engagement region structures, a standard-sized modular manifold can accommodate a wide variety of valves and other fluid management structures without necessitating structural changes to the manifold.

Figure 30:
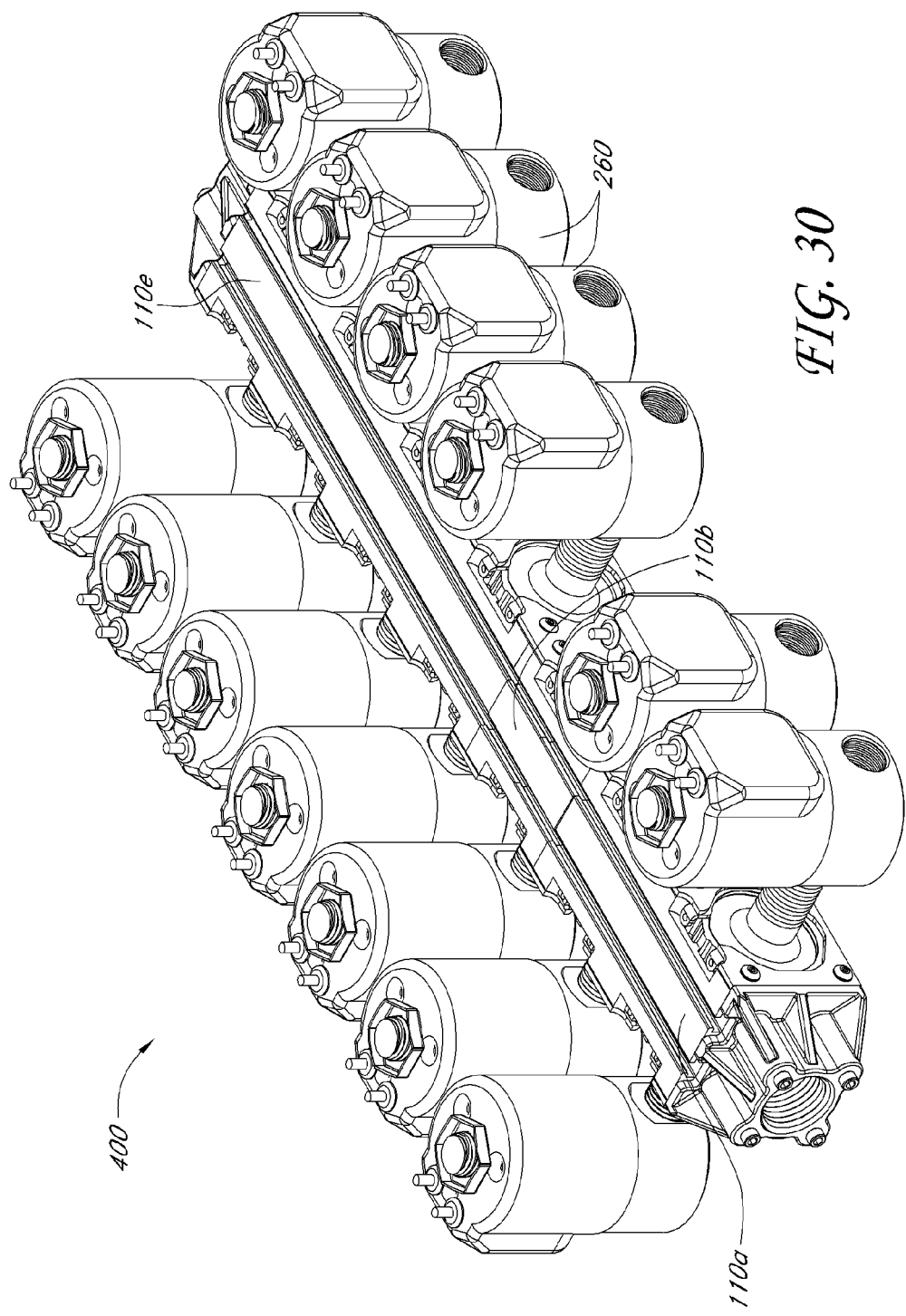
FIG. 30 shows yet another embodiment and configuration of a manifold with valves in place.
Figure 31:
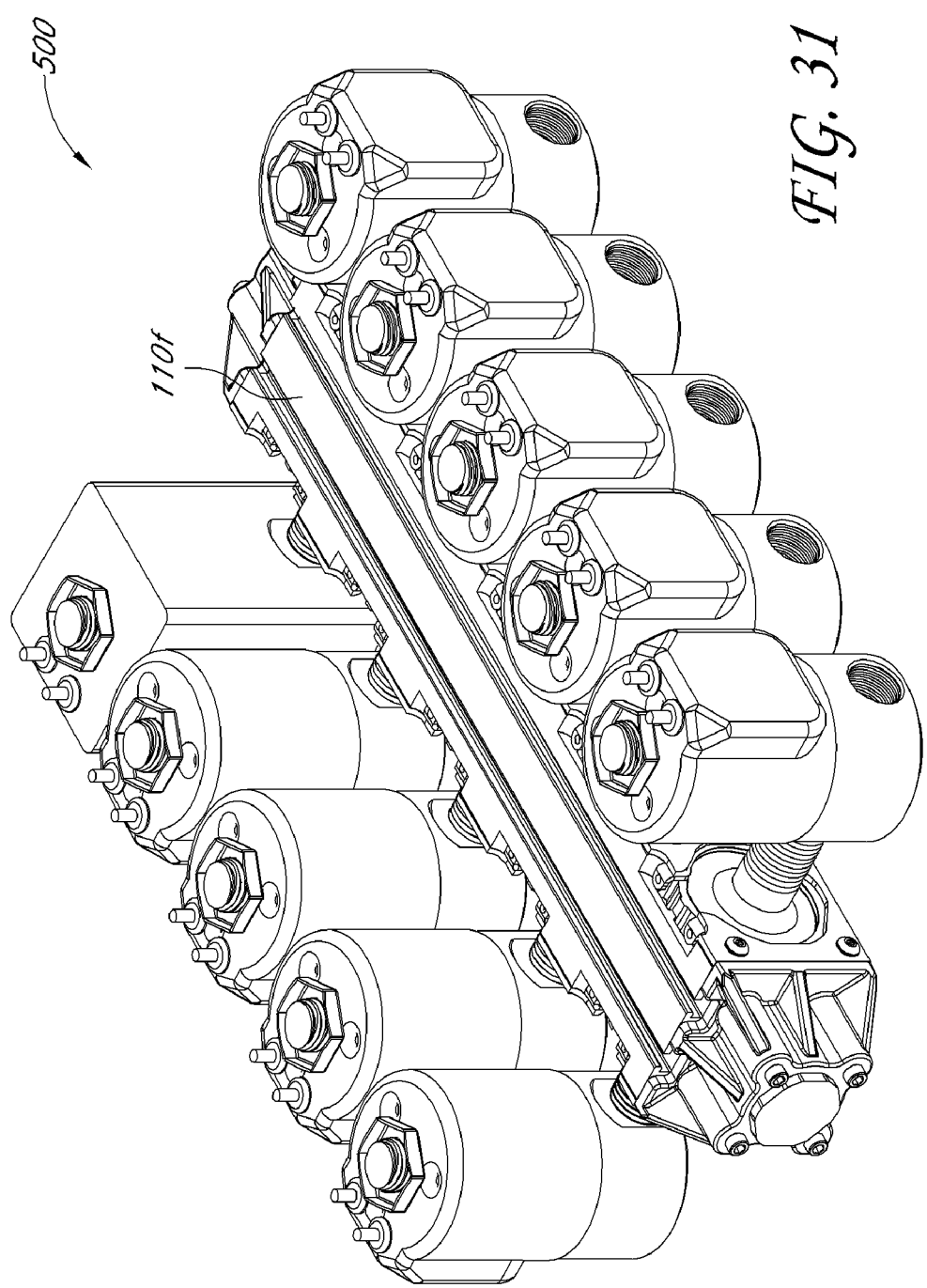
FIG. 31 shows still another embodiment and configuration of a manifold with valves in place.

FIG. 30 illustrates an embodiment of a manifold 400 utilizing a four port module 110a, a two-port module 110b, and an eight port module 110e. In this embodiment the manifold 400 is configured to receive three fluid inputs into three independent cavities, and deliver the three fluids to three families of valves. FIG. 31 illustrates another embodiment of a manifold 500 using a single, ten port module 110f.

Preferably each manifold embodiment can be assembled from standard modular components to meet the requirements of a specific, customized application. The configuration of the manifold body may thus be specifically configured to accommodate any number of valve ports or fluids. The valve adapters may be configured to match specific structural or flow requirements of any valves or interfaces required for the particular application. Additionally the valves may be coupled and decoupled with the manifold body using the snap rings without disassembling the valve body.

Manifold structures having features in accordance with the principles discussed herein can be modified or improved with minimal waste. For example, if a user having a manifold configured in accordance with FIG. 28 developed a need for an additional two valves handling the first fluid, the user can easily increase the manifold capacity with relatively minimal waste. For example, in one embodiment the user may modify the manifold by removing the plates and end plate 180a, obtaining an eight-port manifold module and replacing the existing six-port module with the eight-port module, obtaining a set of side plates that are one port-length longer than the previous plates, and installing the side and end plates to complete the manifold modification. As such, a larger manifold is obtained without requiring the old manifold to be discarded. In another embodiment, a user can functionally make the same improvement with even less waste by adding a two-port module to the end of the existing three port module, connecting the modules using a flow coupler, and replacing the existing side plates with longer side plates.

In order to facilitate customized construction of new manifolds and customized modification of existing manifolds, preferably a plurality of standard-sized manifold modules are available, along with a plurality of types of module couplers as described above. Further, sets of plates having lengths configured to match manifolds having various numbers of valve ports may be obtained and/or provided in a construction or modification kit. It is also to be understood that still further module configurations can be employed. For example, in another embodiment, at least one module has a blank portion in place of at least one valve port. Such blank portion preferably comprises a closed portion of the module having no port.

Throughout the present specification the valve adapters have been characterized as interceding between the manifold and a valve. It is to be understood that such adapters need not be limited to accommodating valves, but can be used with any apparatus with which flow from and/or to the manifold is desired to be communicated. Further, the embodiments disclosed above have employed end ports having structure significantly different than valve ports disposed along the sides of the manifold. It is to be understood that, in some embodiments, end ports can be configured substantially the same as the valve ports, and may employ adapters in a manner similar to the valve ports. Further, in some such embodiments the same adapters that fit into side ports will fit into end ports.

Figure 32:
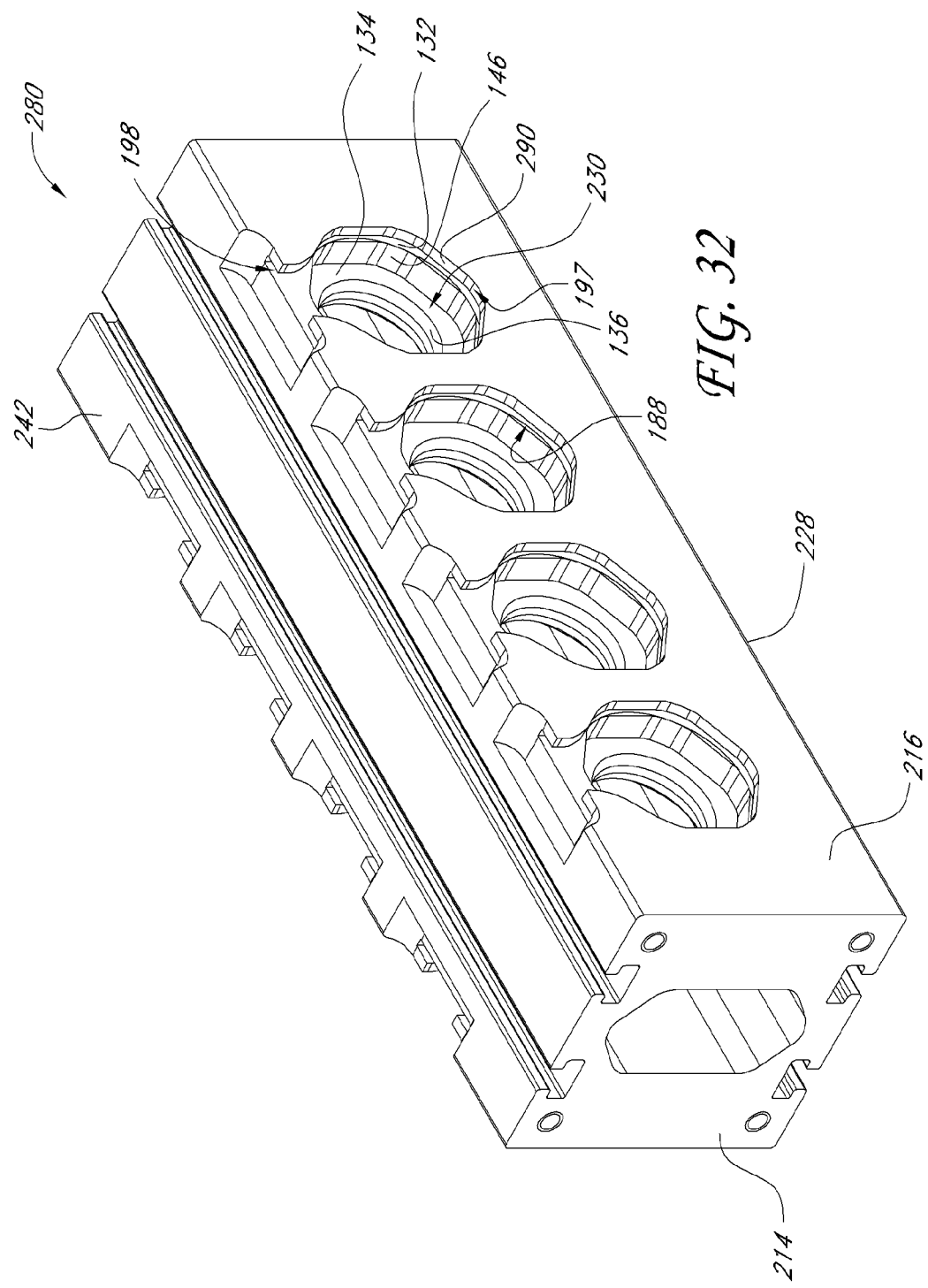
FIG. 32 is still another embodiment of a manifold body.
Figure 33:
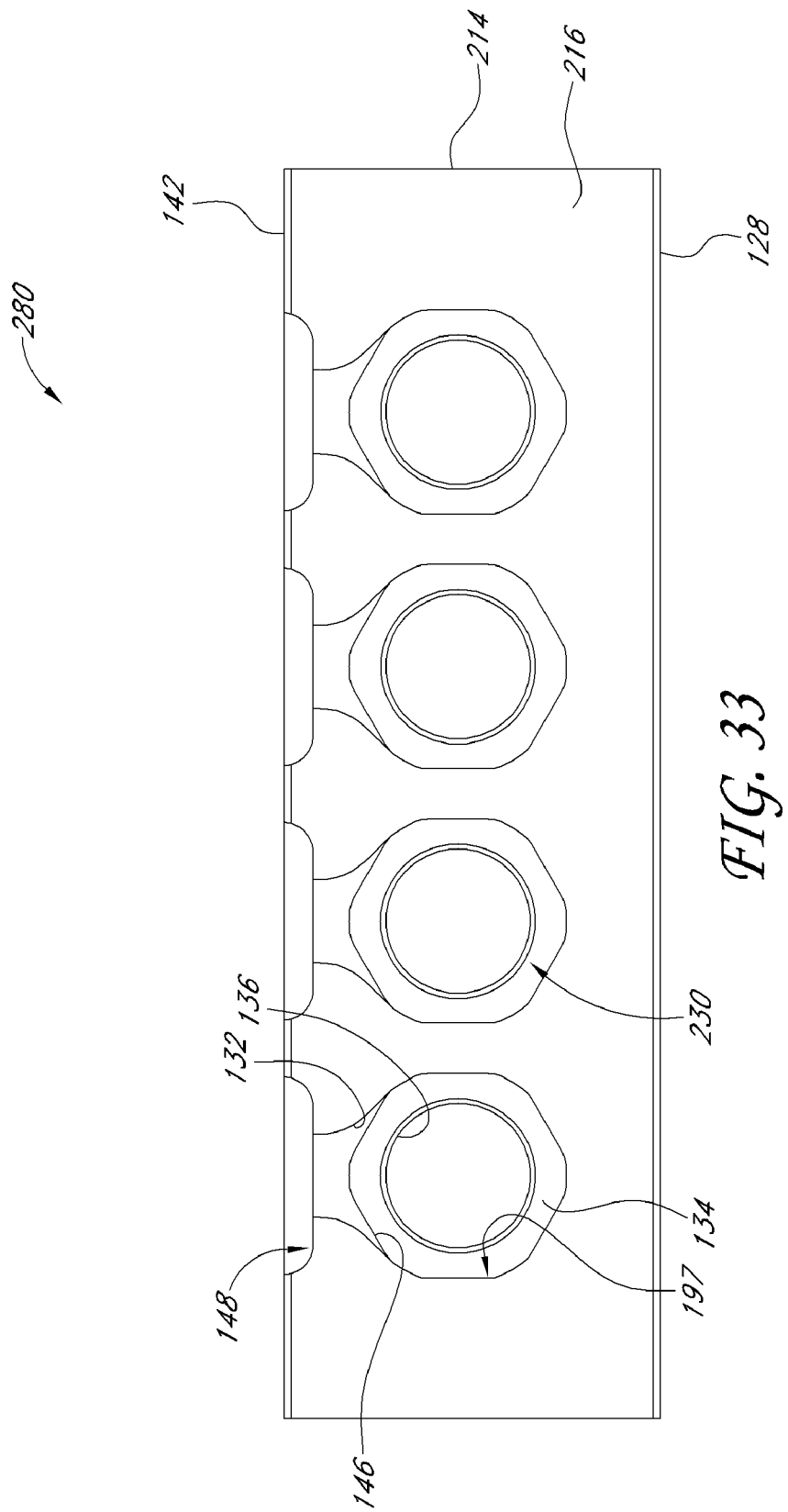
FIG. 33 is a side view of the manifold body of FIG. 32.

With reference next to FIGS. 32 and 33, another embodiment of a manifold body 280 is illustrated. In this embodiment the manifold body 280 comprises a single module. The body 280 has top and bottom faces 242, 228, opposing side faces 216 and opposing end faces 214. A plurality of valve ports 230 are formed through the side faces 216. In the illustrated embodiment each valve port 230 is generally defined by a first outer wall 132, a valve adapter interface 146, a first recessed face 134, a first interior wall 136, and a second outer wall 290 that defines a valve adapter orifice 197. Pockets 198, 188 are defined between the interface 146 and second wall 290. As can be seen, the structure of the illustrated embodiment has many similarities with, for example, the manifold 100 of FIG. 1, with a difference being that the features of the side plates 190 of the FIG. 1 manifold 100 are incorporated into the unitarily-formed manifold body 280 of FIGS. 32-33, at least partially as the second outer wall 290. As such, valves and adapters can be expected to interface similarly with this embodiment as in embodiments above, and a locking member 160 can lock an adapter into place in the ports. Embodiments as discussed above can be constructed of various materials, including polymers, ceramics, metals such as aluminum, or combinations thereof.

The embodiments discussed above have employed a snap ring as the locking member 160 to prevent the adapter 170 from moving out of engagement with the manifold valve port. It is to be understood that other embodiments may employ locking members having differing structures. For example, in one embodiment, the manifold can be configured so that two elongate channels extend down through the top surface of the module at the side face so that elongate pockets are formed when the plate is in place. After an adapter is positioned in the valve port, a U-shaped pin can be advanced into the pockets so as to be positioned on both sides of the adapter's second projection 181 and thus block the adapter from moving away from engagement with the port. In some embodiments a detent mechanism can be provided so that the U-shaped pin is releasably held within the pockets. In additional embodiments the channels are formed within the manifold so that the pockets are solely defined by the channels rather than defined between the channels and a plate. In these embodiments the pin will extend through the manifold top surface during installation, but preferably is seated below the surface when installed.

In some embodiments a multi-pin locking member can be configured to simultaneously fit into pockets corresponding to more than one valve port. For example, a single locking member could block one, two or all of the adapters installed on one side of a manifold from decoupling from engagement with the associated valve port. Most preferably, however, the locking mechanism is configured so that each locking member is associated with only a single adapter, so that the locking member can be actuated without affecting adjacent adapters.

In still another embodiment, a locking member comprises a pivot portion and the manifold modules comprise a hinge adjacent each valve port. The pivot portion of the locking member fits in the hinge so that the locking member can be hingedly opened and closed. An attachment point such as a threaded or J-lock-enabled bolt releasably holds the locking member in a closed position. In operation, the locking member is hinged open to enable insertion of the adapter, and is then closed over the adapter and secured in the closed position so as to block the adapter from slipping or working its way out of the port. Such embodiments may or may not employ a plate. In an embodiment having a plate, preferably the plate comprises an aperture large enough to accommodate working of the hinged locking member without necessitating removal of the plate.

It is to be understood that yet further structures in addition to the examples discussed herein can be employed as locking mechanisms to hold the adapter in place within the valve port in accordance with principles discussed herein. For example, in some preferred embodiments a locking mechanism is configured so as to not extend through the upper or lower surface of the manifold when installed. In a further preferred embodiment a locking system is configured so that a locking member of the system does not extend through the upper or lower surface during an operation of installing or removing a valve adapter. In further preferred embodiments the locking system is configured so that only a single locking member is provided per port so that each of the valve adapters can be installed or removed independently of others of the valve adapters.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. For example, a manifold employing modules as in the embodiments discussed in connection with FIGS. 32-33 can be made up of a plurality of such modules joined end-to-end such as in the embodiments discussed in connection with FIGS. 1-11. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A fluid management system, comprising:
   a manifold body comprising a top surface, a bottom surface, and a side surface, the manifold body defining a chamber, a plurality of ports formed through the side surface and communicating with the chamber;
   an adapter having a manifold engagement region comprising a sealing portion configured to sealingly engage one of the ports of the manifold body, the adapter having an axis that is generally aligned with an axis of the port when the adapter is engaged with the port, the adapter having a lock surface disposed proximal of the sealing portion and facing generally proximally;
   wherein each port of the manifold body comprises an outer wall having an outer wall aperture, and the adapter and port are configured so that when the sealing portion sealingly engages a port, the adapter lock surface is disposed distal of the port outer wall;
   a pocket defined on a side of the manifold body outer wall opposite the manifold body side face; and
   a locking member configured to removably fit into the pocket and to extend at least partially across the port so as to be interposed between the adapter lock surface and a plane of the manifold body outer wall;
   wherein the locking member is compressible between a first configuration and a second configuration, wherein when in the first configuration the locking member can be advanced along the port axis, through the outer wall aperture, and positioned within the pocket, and wherein when in the second configuration the locking member is at least partially relaxed and will not fit through the outer wall aperture.

2. The fluid management system of claim 1, wherein when fit into the pocket, the locking member is interposed between the adapter lock surface and the plane of the manifold body outer wall on opposing sides of the adapter axis.

3. The fluid management system of claim 1, wherein the pocket is defined by an engagement aperture formed in the body adjacent the outer wall, and at least a portion of the engagement aperture has a diameter greater than a diameter of the outer wall aperture.

4. The fluid management system of claim 3, wherein the engagement aperture has a generally circular circumference.

5. The fluid management system of claim 4, wherein the locking member has a generally incomplete ring-shape and comprises spaced apart tabs, wherein a diameter of the locking member is reduced when the tabs are urged toward one another.

6. The fluid management system of claim 1, wherein the locking member has a generally incomplete ring-shape and comprises spaced apart tabs, wherein a diameter of the locking member is reduced when the tabs are urged toward one another, and wherein a distance between the tabs is greater when the locking member is in the second configuration that when the locking member is in the first configuration.

7. The fluid management system of claim 6, wherein no part of the locking member extends past the manifold body top surface or bottom surface when fit into the pocket.

8. The fluid management system of claim 7, wherein the manifold body and locking member are configured so that the locking member can be fit into and removed from the pocket without crossing the manifold body top surface or bottom surface.

9. The fluid management system of claim 8, wherein the manifold body comprises a space configured to accept the locking member tabs therewithin.

10. The fluid management system of claim 1, wherein the manifold body outer wall is detachably connected to the rest of the manifold body.

11. The fluid management system of claim 10, wherein the outer wall comprises an elongate cladding.

12. The fluid management system of claim 11, wherein the pocket is defined between the outer wall and the manifold body.

13. The fluid management system of claim 11, wherein the manifold comprises a plurality of modules joined together, and wherein the elongate cladding spans between and connects adjacent modules, and wherein the locking member interacts with only a single one of the ports.

* * * * *